United States Patent
Ohashi

(10) Patent No.: US 7,500,361 B2
(45) Date of Patent: Mar. 10, 2009

(54) HYDRAULIC PUMP UNIT AND WORKING VEHICLE

(75) Inventor: Ryota Ohashi, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 361 days.

(21) Appl. No.: 11/349,238

(22) Filed: Feb. 8, 2006

(65) Prior Publication Data

US 2006/0242956 A1 Nov. 2, 2006

(30) Foreign Application Priority Data

Apr. 14, 2005 (JP) ............................. 2005-117006

(51) Int. Cl.
*F16D 31/02* (2006.01)
*F16D 39/00* (2006.01)
*G05G 9/047* (2006.01)

(52) U.S. Cl. ........................................ 60/444; 60/488

(58) Field of Classification Search .................. 60/443, 60/444, 488; 91/506; 74/471 XY
See application file for complete search history.

(56) References Cited

U.S. PATENT DOCUMENTS

| | | | |
|---|---|---|---|
| 3,742,821 A * | 7/1973 | Martin | ........................ 91/506 |
| 4,076,090 A | 2/1978 | Krusche et al. | |
| 4,203,290 A | 5/1980 | Burckardt | |
| 4,561,250 A | 12/1985 | Aoyagi et al. | |
| 5,875,631 A * | 3/1999 | Smith | .......................... 60/444 |
| 6,176,085 B1* | 1/2001 | Kirakos-Shirvanyan | ...... 60/444 |
| 6,374,605 B1* | 4/2002 | Dvorak et al. | .................. 60/444 |
| 6,425,244 B1 | 7/2002 | Ohashi et al. | |
| 6,487,856 B1* | 12/2002 | Ohashi et al. | .................. 60/486 |
| 6,601,386 B1 | 8/2003 | Hori et al. | |
| 6,684,634 B1* | 2/2004 | Sakamoto | .................... 60/444 |

FOREIGN PATENT DOCUMENTS

| | | |
|---|---|---|
| FR | 2327433 | 5/1977 |
| GB | 2320314 A | 6/1998 |
| WO | WO 02/27217 | 4/2002 |

OTHER PUBLICATIONS

European Search Report for European Appl. No. 06 00 2454, European Patent Office, Munich, mailed on Jan. 19, 2007, 3 pages.

* cited by examiner

*Primary Examiner*—Michael Leslie
(74) *Attorney, Agent, or Firm*—Sterne, Kessler, Goldstein & Fox P.L.L.C.

(57) ABSTRACT

There is provided a hydraulic pump unit of variable displacement type disposed away from a pair of hydraulic motor units which are capable of being independently arranged, the pump unit fluidly-connected to the pair of hydraulic motor units so as to change the outputs of the pair of hydraulic motor units in both forward and reverse rotation directions. The pump unit includes a hydraulic pump body operatively rotated and driven by a driving source, a pump case surrounding the hydraulic pump body, a capacity adjusting mechanism for changing the capacity of the hydraulic pump body, and a hydraulic servomechanism for transmitting an external input based on a manual operation to the capacity adjusting mechanism by utilizing a hydraulic force.

7 Claims, 17 Drawing Sheets

HYDRAULIC PUMP UNIT AND WORKING VEHICLE

BACKGROUND OF THE INVENTION

1. Field of the Invention

The present invention relates to a hydraulic pump unit of variable displacement type disposed away from a pair of hydraulic motor units which are capable of being independently arranged, the hydraulic pump unit fluidly-connected to the pair of hydraulic motor units so as to change the outputs of the pair of hydraulic motor units in both forward and reverse directions.

Also, the present invention relates to a working vehicle provided with a pair of hydraulic motor units, a hydraulic pump unit of variable displacement type and a travel operation mechanism capable of being manually operated.

2. Related Art

It has been conventionally known that a hydraulic pump unit of variable displacement type and a hydraulic motor unit, which are fluidly-connected to each other so as to form an HST, are configured to be capable of being independently arranged.

The hydraulic pump unit and the hydraulic motor unit are particularly useful in a working vehicle needing to provide a space between a pair of driving wheels so as to stabilize the body posture at the time of turning such as a mower tractor capable of turning in place (zero turn) (for example, see U.S. Pat. No. 6,425,244).

The hydraulic pump unit of variable displacement type is provided with a hydraulic pump body operatively rotated and driven by a driving source and a capacity adjusting mechanism for changing the capacity of the hydraulic pump body. The output of the hydraulic motor unit can be changed by operating the capacity adjusting mechanism.

However, in the conventional hydraulic pump unit of variable displacement type, since the capacity adjusting mechanism is merely connected to a manual controlling member such as a traveling lever erected from right and left side floors of a driver sheet via a machinery link mechanism, large manual operation power and manual operation amount are required for the travel operation of a vehicle.

Since the large manual operation power and the manual operation amount are required for the operation of the capacity adjusting mechanism, it is difficult to miniaturize the controlling member.

The present invention has been accomplished in view of the prior art, and it is an object of the present invention to provide a hydraulic pump unit of variable displacement type capable of reducing the manual operation power and the manual operation amount for changing the capacity of the hydraulic pump body.

It is another object of the present invention to provide a working vehicle provided with a pair of hydraulic motor units for respectively driving a pair of driving wheels, a hydraulic pump unit of variable displacement type having a pair of hydraulic pump bodies respectively fluidly-connected to the pair of hydraulic motor units, and a controlling member for changing the supply-discharge oil amount of the pair of hydraulic pump bodies and capable of being manually operated, the working vehicle capable of miniaturizing the controlling member.

SUMMARY OF THE INVENTION

According to one aspect of the present invention, there is provided a hydraulic pump unit of variable displacement type disposed away from a pair of hydraulic motor units which are capable of being independently arranged, the pump unit fluidly-connected to the pair of hydraulic motor units so as to change the outputs of the pair of hydraulic motor units in both forward and reverse rotation directions.

The pump unit includes a hydraulic pump body operatively rotated and driven by a driving source, a pump case surrounding the hydraulic pump body, a capacity adjusting mechanism for changing the capacity of the hydraulic pump body, and a hydraulic servomechanism for transmitting an external input based on a manual operation to the capacity adjusting mechanism by utilizing a hydraulic force.

With this configuration, the manual operation power and the manual operation amount required for operating the capacity adjusting mechanism can be reduced. Therefore, the manual controlling member for operating the capacity adjusting mechanism can be miniaturized.

In one embodiment, the hydraulic pump body includes first and second hydraulic pump bodies respectively and independently fluidly-connected to the pair of hydraulic motor units, the capacity adjusting mechanism includes first and second capacity adjusting mechanisms respectively corresponding to the first and second hydraulic pump bodies, and the hydraulic servomechanism includes a first and second hydraulic servomechanisms respectively corresponding to the first and second capacity adjusting mechanisms.

In another embodiment, the pair of hydraulic motor units are fluidly-connected to each other so as to form a closed circuit.

In the embodiment, the hydraulic pump body includes a single hydraulic pump body for traveling fluidly-connected to the closed circuit, and a hydraulic pump body fluidly-connected to the other hydraulic actuator other than the pair of hydraulic motor units.

In the above various configurations, the hydraulic servomechanism preferably includes a servo piston operatively connected to the capacity adjusting mechanism and accommodated in a reciprocating manner within a piston accommodating chamber so as to divide the piston accommodating chamber into a regular rotation oil chamber and a reverse rotation oil chamber, and a directional switching valve incorporated in the servo piston in a movable manner relative to the servo piston in a state of being operable by the external input.

The servo piston is provided with flow channels including an input passage into which operation oil is inputted, and a regular rotation passage and a reverse rotation passage respectively communicated with the regular rotation oil chamber and the reverse rotation oil chamber.

The hydraulic servomechanism is configured so that the flow channels are switched according to the relative position of the directional switching valve to the servo piston.

For example, the hydraulic servomechanism may have a servo piston case defining the piston accommodating chamber and detachably connected to the pump case. The capacity adjusting mechanism may have an output adjusting member for changing the reciprocating range of the hydraulic piston of the hydraulic pump body according to its tilting position, and a control shaft having a base end portion operatively connected to the output adjusting member so as to tilt the output adjusting member and a tip end portion accessible from outside of the pump case. The tip end portion of the control shaft is operatively connected to the servo piston via a crank arm engaged with the external wall of the servo piston.

Alternatively, the piston accommodating chamber may be provided in the wall portion of the pump case. The capacity adjusting mechanism has an output adjusting member for changing the reciprocating range of the hydraulic piston of the hydraulic pump body according to its tilting position, and a control shaft having a base end portion operatively connected to the output adjusting member so as to tilt the output adjusting member. The control shaft is configured so that its tip end portion is engaged with the external wall of the servo piston.

According to another aspect of the present invention, there is provided a working vehicle including a driving source, a pair of right and left driving wheels, first and second hydraulic motor units for respectively and independently driving the pair of driving wheels, a hydraulic pump unit of variable displacement type having first and second hydraulic pump bodies respectively fluidly-connected to the first and second hydraulic motor units so as to change the outputs of the first and second hydraulic motor units respectively and independently in both forward and reverse rotation directions, and a travel operation mechanism for changing the capacities of the first and second hydraulic pump bodies and capable of being manually operated.

The hydraulic pump unit includes the first hydraulic pump body operatively rotated and driven by the driving source, a first capacity adjusting mechanism for changing the capacity of the first hydraulic pump body, the first capacity adjusting mechanism including a first output adjusting member for changing the reciprocating range of the hydraulic piston of the first hydraulic pump body according to its tilting position and a first control shaft having a base end portion operatively connected to the first output adjusting member so as to tilt the first output adjusting member, a first hydraulic servomechanism for transmitting an input from the travel operation mechanism to the first capacity adjusting mechanism by utilizing the hydraulic force, the second hydraulic pump body operatively rotated and driven by the driving source, a second capacity adjusting mechanism for changing the capacity of the second hydraulic pump body, the second capacity adjusting mechanism including a second output adjusting member for changing the reciprocating range of the hydraulic piston of the second hydraulic pump body according to its tilting position and a second control shaft having a base end portion operatively connected to the second output adjusting member so as to tilt the second output adjusting member, and a second hydraulic servomechanism for transmitting the input from the travel operation mechanism to the second capacity adjusting mechanism by utilizing the hydraulic force.

The travel operation mechanism is provided with a controlling member integrally having a single controlling portion capable of being manually operated, and first and second outputting portions respectively and operatively connected to the first and second hydraulic servomechanisms. The controlling member is configured so as to be rotatable around both a traveling referential shaft and a steering referential shaft orthogonal to the traveling referential shaft.

The traveling direction and traveling speed of the vehicle are defined by the rotating direction and the rotating amount around the traveling referential shaft of the controlling member, and the turning direction and turning radius of the vehicle are defined by the rotating direction and rotating amount around the steering referential shaft of the controlling member.

With the configuration, the manual operation power and the manual operation amount required for operating the travel operation mechanism can be reduced as compared with the conventional working vehicle, thereby miniaturizing the travel operation mechanism.

Preferably, the controlling member is operatively connected to the first and second hydraulic servomechanisms so that the first output adjusting member is maximally tilted in the regular rotation direction and the second output adjusting member is maximally tilted in the reverse rotation direction when the controlling member is positioned at a first zero turn position where the controlling member is at a neutral position around the traveling referential shaft and is maximally oscillated to one side around the steering referential shaft, the first output adjusting member is maximally tilted in the reverse rotation direction and the second output adjusting member is maximally tilted in the regular rotation direction when the controlling member is positioned at a second zero turn position where the controlling member is at the neutral position around the traveling referential shaft and is maximally oscillated to the other side around the steering referential shaft, both the first and second output adjusting members are maximally tilted in the regular rotation direction when the controlling member is positioned at a forward maximum output position where the controlling member is at the neutral position around the steering referential shaft and is maximally oscillated to one side around the traveling referential shaft, and both the first and second output adjusting members are maximally tilted in the reverse rotation direction when the controlling member is positioned at a reverse maximum output position where the controlling member is at the neutral position around the steering referential shaft and is maximally oscillated to the other side around the traveling referential shaft.

According to still another aspect of the present invention, there is provided a working vehicle including a driving source, a pair of right and left driving wheels, first and second hydraulic motor units for respectively and independently driving the pair of driving wheels, a hydraulic pump unit of variable displacement type having first and second hydraulic pump bodies respectively fluidly-connected to the first and second hydraulic motor units so as to change the outputs of the first and second hydraulic motor units respectively and independently in both forward and reverse rotation directions, and a travel operation mechanism for changing the capacities of the first and second hydraulic pump bodies and capable of being manually operated.

The hydraulic pump unit includes the first hydraulic pump body operatively rotated and driven by the driving source, a first capacity adjusting mechanism for changing the capacity of the first hydraulic pump body, the first capacity adjusting mechanism including a first output adjusting member for changing the reciprocating range of the hydraulic piston of the first hydraulic pump body according to its tilting position and the first control shaft having the base end portion operatively connected to the first output adjusting member so as to tilt the first output adjusting member, a first hydraulic servomechanism for transmitting an input from the travel operation mechanism to the first capacity adjusting mechanism by utilizing the hydraulic force, the second hydraulic pump body operatively rotated and driven by the driving source, a second capacity adjusting mechanism for changing the capacity of the second hydraulic pump body, the second capacity adjusting mechanism including a second output adjusting member for changing the reciprocating range of the hydraulic piston of the second hydraulic pump body according to its tilting position and a second control shaft having a base end portion operatively connected to the second output adjusting member so as to tilt the second output adjusting member, and a second hydraulic servomechanism for transmitting the input from the travel operation mechanism to the second capacity adjusting mechanism by utilizing the hydraulic force.

The travel operation mechanism has right and left controlling members which are manually operated and which are respectively and operatively connected to the first and second hydraulic servomechanisms.

With the configuration, the manual operation power and the manual operation amount required for operating the travel operation mechanism can also be reduced as compared with the conventional working vehicle, thereby miniaturizing the right and left controlling members.

BRIEF DESCRIPTION OF THE DRAWINGS

The above, and other objects, features and advantages of the present invention will become apparent from the detailed description thereof in conjunction with the accompanying drawings wherein.

FIG. 8 (b) is a graph showing a relationship between an oscillating amount of the controlling member around a traveling referential shaft and a steering referential shaft, and a traveling speed and a steering direction of the working vehicle.

DETAILED DESCRIPTION OF THE PREFERRED EMBODIMENTS

Embodiment 1

Hereinafter, a preferred embodiment of a hydraulic pump unit according to the present invention will be described referring to the accompanying drawings.

Figure 1:
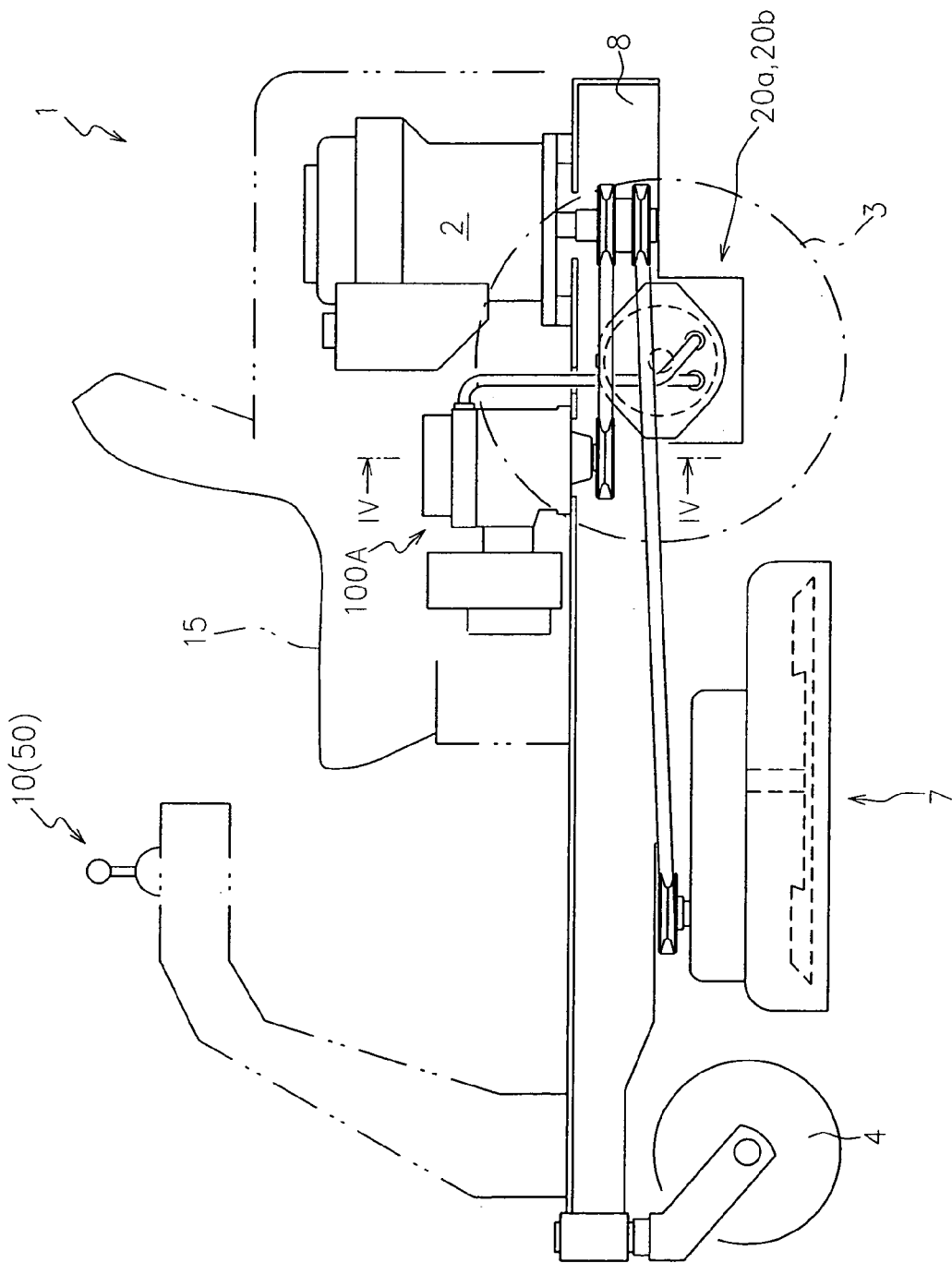
FIG. 1 is a schematic side view of a working vehicle to which a hydraulic pump unit according to a first embodiment of the present invention is applied.
Figure 2:
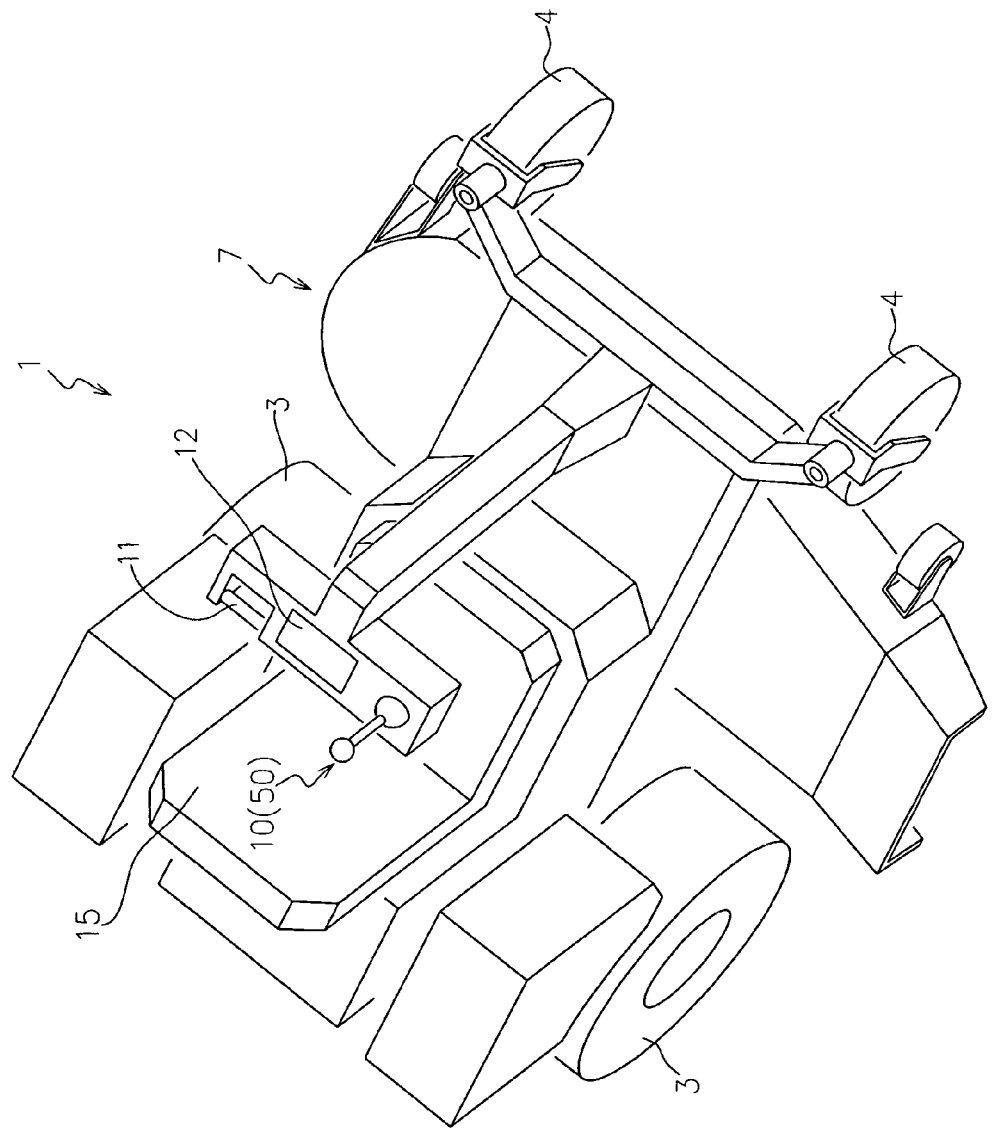
FIG. 2 is a schematic perspective view of the working vehicle shown in FIG. 1.

FIGS. 1 and 2 show a schematic side view and a schematic perspective view of a working vehicle 1 to which a hydraulic pump unit 100A according to the present embodiment is applied, respectively.

Figure 3:
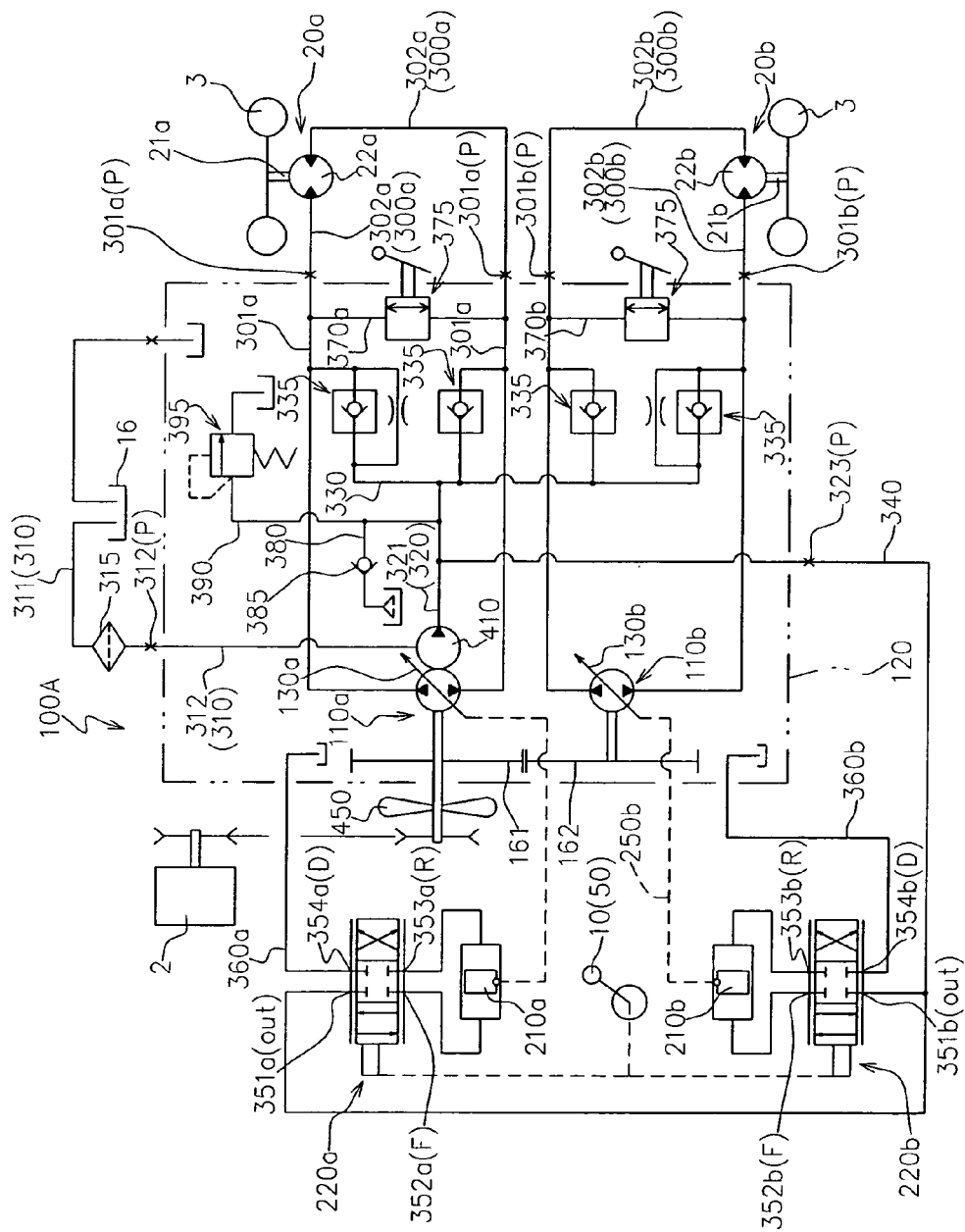
FIG. 3 is a hydraulic circuit diagram of the working vehicle shown in FIGS. 1 and 2.

FIG. 3 shows a hydraulic circuit diagram of the working vehicle 1.

As shown in FIGS. 1 to 3, the working vehicle 1 is provided with a vehicle frame 8, a driving source 2 supported by the vehicle frame 8, a pair of right and left driving wheels 3 (rear wheels in the present embodiment), caster wheels 4 (a pair of front wheels in the present embodiment), a first and second hydraulic motor units 20a, 20b for respectively and independently driving the pair of driving wheels 3, a hydraulic pump unit 100A of variable displacement type according to the present embodiment, and a travel operation mechanism 10 for changing the supply-discharge oil amount of the hydraulic pump unit 100A and capable of being manually operated.

Numeral 15 in FIG. 1 or 2 designates a driver seat. A nearly T-shaped steering post is erected from a floor in front of the driver seat, and the travel operation mechanism 10 is arranged on the upper surface of the post. Numeral 7 designates a mower apparatus supported by the vehicle frame 8 so as to be located between the driving wheels 3 and the caster wheels 4 in the longitudinal direction of the vehicle.

In the working vehicle 1, the mower apparatus 7 is operatively driven by the driving source 2 via a pulley/belt mechanism.

The first and second hydraulic motor units 20a, 20b can be independently arranged from each other, and are symmetrically arranged in a vehicle width direction so as to be located near the corresponding driving wheels 3.

The first and second hydraulic motor units 20a, 20b respectively have first and second motor shafts 21a, 21b operatively connected to the corresponding driving wheels 3, and first and second hydraulic motor bodies 22a, 22b for rotating and driving the corresponding motor shafts 21a, 21b.

In the present embodiment, both the first and second hydraulic motor units 20a, 20b are of a fixed displacement type, and the supply-discharge oil amount of the hydraulic motor body is fixed.

Figure 4:
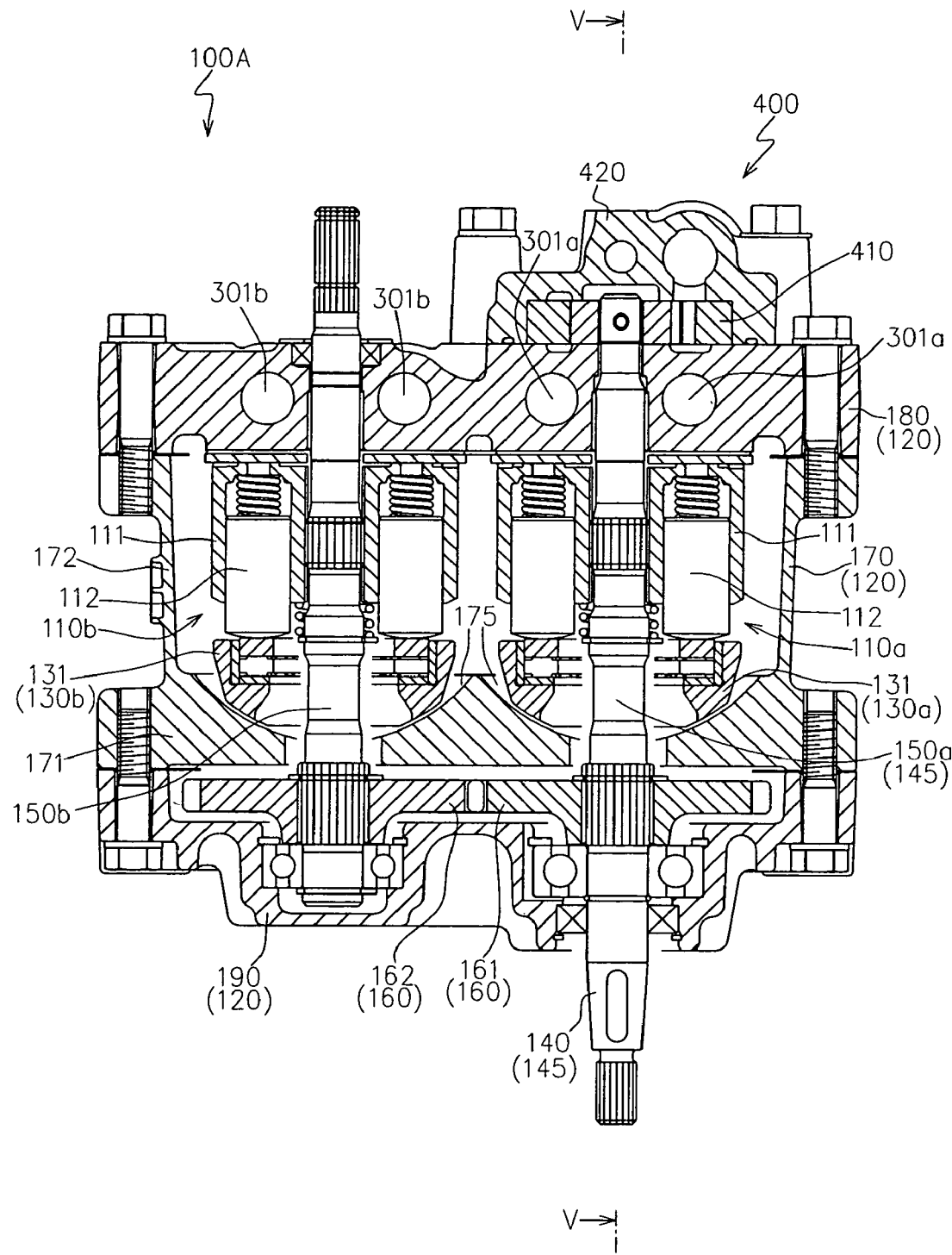
FIG. 4 is a sectional view taken in IV-IV line in FIG. 1.

FIG. 4 shows a longitudinal sectional front view of the hydraulic pump unit 100A taken in IV-IV line in FIG. 1.

Figure 5:
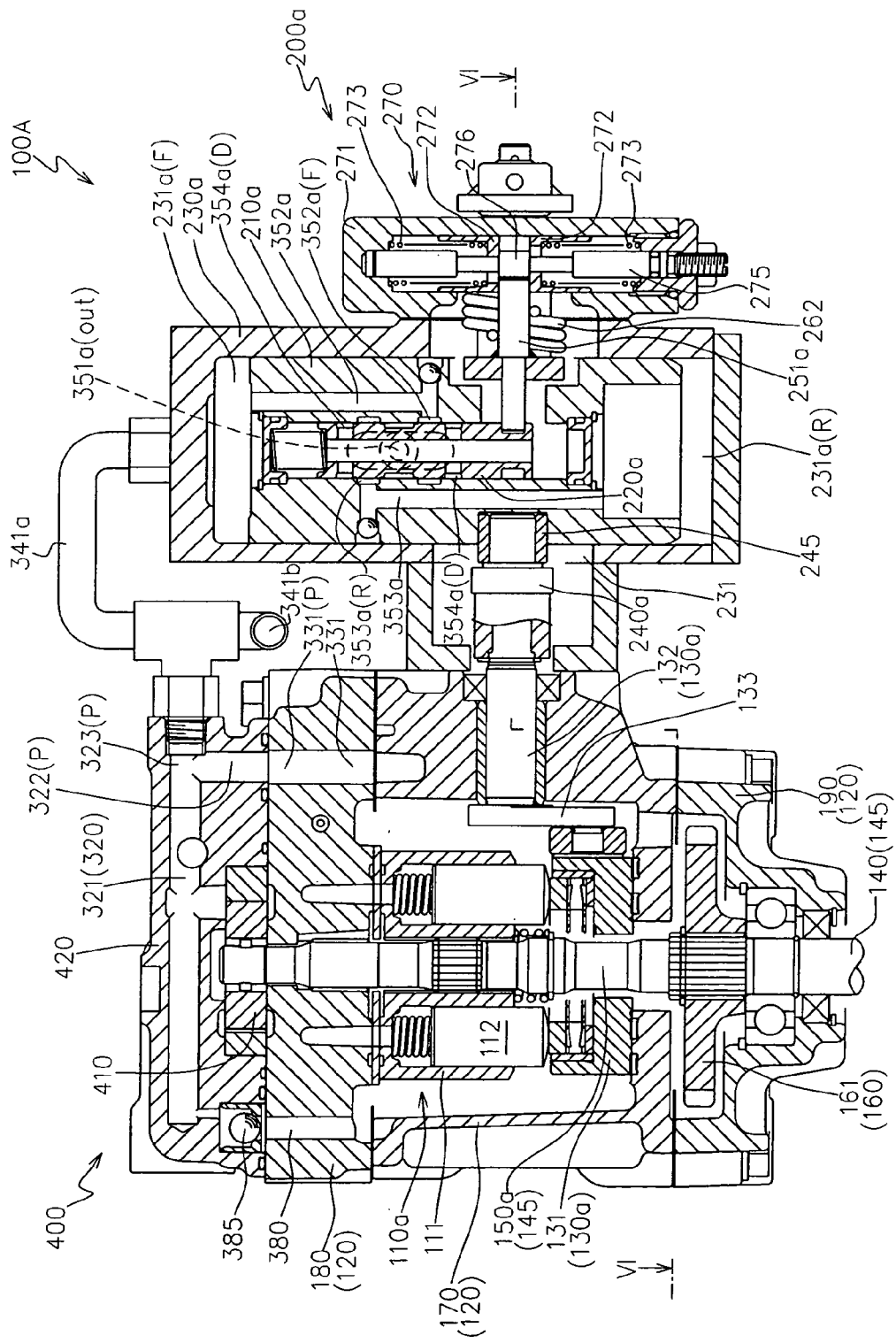
FIG. 5 is a sectional view taken in V-V line in FIG. 4.
Figure 6:
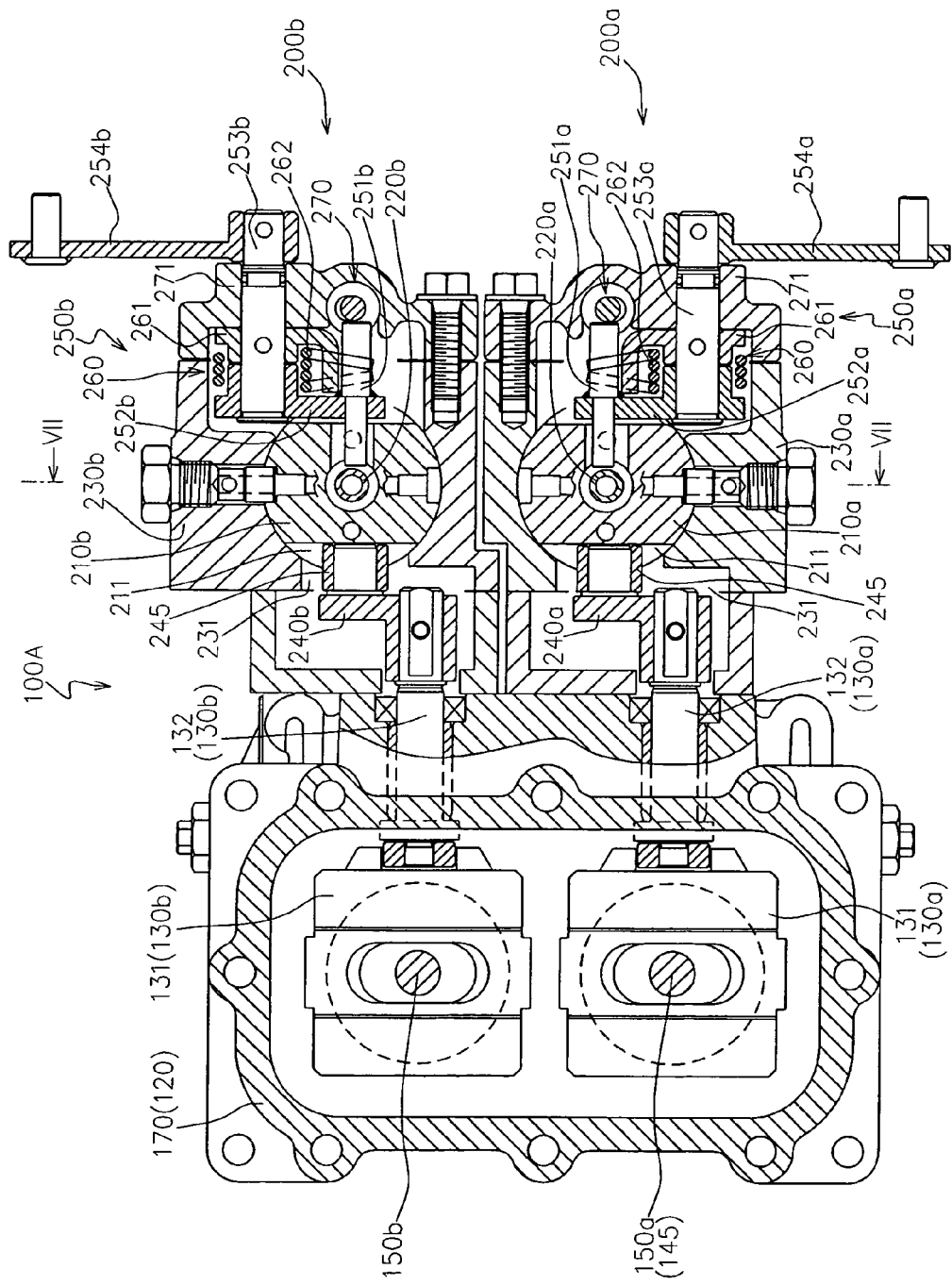
FIG. 6 is a sectional view taken in VI-VI line in FIG. 5.

FIGS. 5 and 6 show sectional front views taken in V-V line in FIG. 4 and taken in VI-VI line in FIG. 5, respectively.

As shown in FIGS. 4 to 6, the hydraulic pump unit 100A is provided with a hydraulic pump body 110 operatively rotated and driven by the power from the driving source 2, a pump case 120 for surrounding the hydraulic pump body, a capacity adjusting mechanism 130 for changing the capacity of the hydraulic pump body, and a hydraulic servomechanism 200 for transmitting an external input based on a manual operation to the capacity adjusting mechanism 130 by utilizing a hydraulic force.

In the present embodiment, the hydraulic pump unit 100A has first and second hydraulic pump bodies 110a, 110b as the hydraulic pump body 110.

The first hydraulic pump body 110a is fluidly-connected to the first hydraulic motor body 22a via a pair of first operation oil lines 300a so as to form a first HST in cooperation with the first hydraulic motor body 22a.

The second hydraulic pump body 110b is fluidly-connected to the second hydraulic motor body 22b via a pair of second operation oil lines 300b so as to form a second HST in cooperation with the second hydraulic motor body 22a.

The hydraulic pump unit 100A, therefore, has first and second capacity adjusting mechanisms 130a, 130b for respectively changing the capacities of the first and second hydraulic pump bodies 110a, 110b as the capacity adjusting mechanism 130, and has first and second hydraulic servomechanisms 200a, 200b for respectively operating the first and second capacity adjusting mechanisms 130a, 130b as the hydraulic servomechanism 200.

The hydraulic pump unit 100A is further provided with an input shaft 140 supported by the pump case 120 so as to be operatively connected to the driving source 2, first and second pump shafts 150a, 150b supported by the pump case 120 so as to rotate and drive the first and second pump bodies 110a, 110b, respectively, and a power transmission mechanism 160 accommodated in the pump case 120 so as to transmit the power from the input shaft 140 to the first and second pump shafts 150a, 150b.

In the present embodiment, the input shaft 140 and the first pump shaft 150a are integrally formed by a single shaft 145 (see FIGS. 4, 5).

The pump case 120 is configured so as to accommodate both the first and second hydraulic pumps 110a, 110b.

Specifically, the pump case 120 has a single case body 170, a single port block 180 (center section) detachably connected to the case body 170, and a single lid member 190 detachably connected to the case body 170.

As shown in FIGS. 4 to 6, the case body 170 has an end wall 171 extending in the direction substantially orthogonal to the axis line direction of the pump shafts 150a, 150b, and a peripheral wall 172 extending in the axis line direction of the pump shaft 150a, 150b from the peripheral portion of the end wall 171.

The peripheral wall 172 has an opening at a free end side opposite to the end wall 171.

The opening is set to a size enough to insert the first and second hydraulic pump bodies 110a, 110b therethrough.

The port block 180 has a supply/discharge oil passages for the first and second hydraulic pump bodies 110a, 110b. The port block 180 is connected to the case body 170 so as to liquid-tightly close the opening in a state where the supply/discharge oil passages are fluid-connected to the first and second hydraulic pump bodies 110a, 110b.

That is, the first and second hydraulic pump bodies 110a, 110b are accommodated in a pump accommodating space defined by the case body 170 and the port block 180.

The lid member 190 is connected to the case body 170 so as to define a power transmission mechanism accommodating space for accommodating the power transmission mechanism 160 between the lid member 190 and the end wall 171.

The input shaft 140 is supported by the pump case 120 with a first end forming an input end extended outward.

As shown in FIG. 1, the driving source 2 is a vertical crankshaft type in the present embodiment. Therefore, the input shaft 140 is supported by the pump case 120 so that the input end is projected vertically. However, when the driving source 2 is of a horizontal crankshaft type, the input shaft may be supported by the pump case 120 so that the input end is horizontally projected.

The first and second pump shafts 150a, 150b are supported at the both sides by the lid member 190 and the plate member 180 so as to support the corresponding hydraulic pump bodies 110a, 110b within the pump accommodating space.

At least one end of one of or both the first and second pump shafts 150a, 150b is preferably projected outward from the pump case 120.

The projecting end is used as a driving shaft for a charge pump body and/or other rotating member attached to the hydraulic pump unit 100A if desired.

In the present embodiment, as described above, the input shaft 140 and the first pump shaft 150a are integrally formed by the single shaft 145.

As shown in FIG. 4, the single shaft 145 has a first end projecting outward through the lid member 190 so as to form the input end and a second end projecting outward through the port block 180.

The second end of the single shaft 145 acts as a driving shaft for a charge pump body 410 to be described later.

In the present embodiment, the first end of the single shaft 145 forms the input end operatively connected to the driving source 2, and also acts as a driving shaft for a cooling fan 450 (see FIG. 3).

In the present embodiment, as shown in FIG. 4, the second pump shaft 150b has a second end projecting outward through the port block 180 so as to output the rotation power to the exterior.

The power transmission mechanism 160 is configured so as to transmit the power from the input shaft 140 to the first and second pump shafts 150a, 150b.

In the present embodiment, as shown in FIGS. 4, 5, the power transmission mechanism 160 has a driving gear 161 supported in a relatively non-rotatable manner by the single shaft 145, and a driven gear 162 supported in a relatively non-rotatable manner by the second pump shaft 150b so as to be engaged with the driving gear 161.

As shown in FIGS. 4, 5, the first and second hydraulic pump bodies 110a, 110b include cylinder blocks 111 supported in a relatively non-rotatable manner by the corresponding pump shafts 150a, 150b within the pump accommodating space, and piston units 112 accommodated in the corresponding cylinder blocks 111 in a reciprocating manner along the axis line direction and in a relatively non-rotatable manner.

The first and second capacity adjusting mechanisms 130a, 130b include output adjusting members 131 for changing the reciprocating range of the hydraulic piston 112 in the corresponding hydraulic pump bodies 110a, 110b according to its tilting position, and control shafts 132 having a base end operatively connected to the corresponding output adjusting member 131 so as to tile the corresponding output adjusting member 131.

As shown in FIG. 4, in the present embodiment, a cradle type movable swash plate is used as the output adjusting member 131.

That is, a recessed arching swash plate receiving surface 175 is formed on the inner surface (the surface facing the hydraulic pump bodies 110a, 110b) of the end wall 171. The cradle type movable swash plate 131 is configured so that one end surface is operatively engaged with the free end of the piston unit 112 and the other end surface is engaged with the arching swash plate receiving surface 175 via a thrust metal having the same shape.

The control shaft 132 is supported by the peripheral wall 172 of the case body 170 in a rotatable manner about its axis, and is configured to tilt the movable swash plate 131 by rotating about its axis.

For details, as shown in FIGS. 5, 6, the control shaft 132 is supported in a rotatable manner about its axis by the peripheral wall 172 of the case body 170 in a state where the base end is operatively connected to the movable swash plate 131 via an arm 133 and the tip end can be accessed from outside of the pump case 120.

Figure 7:
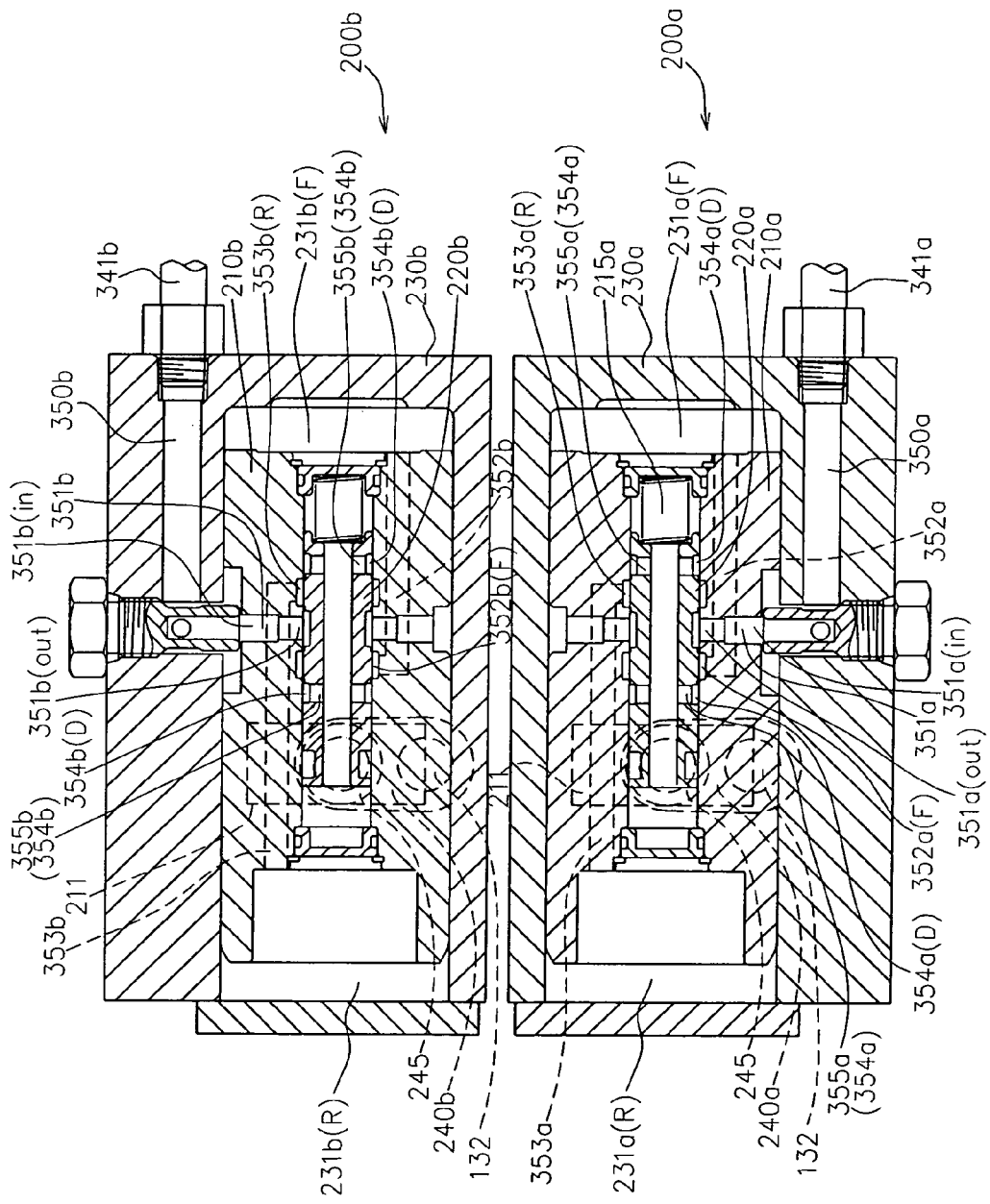
FIG. 7 is a sectional view taken in line VII-VII in FIG. 6.

FIG. 7 shows a sectional view of the first and second hydraulic servomechanisms 200a, 200b taken in line VII-VII in FIG. 6.

The first and second hydraulic servomechanisms 200a, 200b respectively have servo pistons 210a, 210b reciprocatingly accommodated in the piston accommodating chambers in a state where the servo pistons 210a, 210b are operatively connected to the corresponding capacity adjusting mechanisms 130a, 130b, and directional switching valves 220a, 220b for changing passages for operating the servo pistons 210a, 210b according to an external input.

In the present embodiment, the piston accommodating chamber is defined by a servo piston case 230 removably connected to the pump case 120, and the directional switching valves 220a, 220b are incorporated in the corresponding servo pistons 210a, 210b.

Specifically, as shown in FIGS. 5 to 7, the first hydraulic servomechanism 200a is provided with a first servo piston case 230a removably connected to the pump case 120, a first servo piston 210a accommodated in a first piston accommodating chamber defined by the first servo piston case 230a, and a first directional switching valve 220a incorporated in the first servo piston 210a.

The second hydraulic servomechanism 200b has substantially the same constitution as that of the first hydraulic servomechanism 200a.

The corresponding members in the figures are, therefore, designated by the same numerals or the same numerals with replacing subscripts with b, and the detailed description thereof are omitted.

The first servo piston 210a is reciprocatingly accommodated in the first piston accommodating chamber so as to define a first regular rotation oil chamber 231a (F) and a first reverse rotation oil chamber 231a (R).

That is, the first piston accommodating chamber has the first regular rotation oil chamber 231a (F) and the first reverse rotation oil chamber 231a (R) respectively provided at one side and the other side of the axis line direction of the servo piston 210a so as to sandwich the first servo piston 210a.

The first servo piston 210a is operatively connected to the tip end of the corresponding control shaft 132 in a state where the first servo piston 210a is accommodated in the first piston accommodating chamber in a reciprocating manner.

In the present embodiment, as shown in FIGS. 6 and 7, the first servo piston 210a is operatively connected to the tip end of the control shaft 132 via a first crank arm 240a.

The first servo piston case 230a is configured so that the axis line direction of the first servo piston 210a is parallel to the pump shaft 150a.

Alternatively, the first servo piston case 230a may be configured so that the axis line direction of the first servo piston 210a is perpendicular to the pump shaft 150a.

The first crank arm 240a has a base end portion connected to the corresponding control shaft 132 in a relatively non-rotatable manner around the axis of the control shaft 132, an arm portion extending outward in the radial direction from the base end portion on the basis of the axis line of the corresponding control shaft 132, and an engaging portion extending in the axis line direction of the corresponding control shaft 132 from the free end side of the arm portion.

The engaging portion of the first crank arm 240a is engaged with the outer peripheral surface of the first servo piston 210a via an access opening 231 formed on the first servo piston case 230a.

For details, an engaging groove 211 is formed in the direction orthogonal to the axis line of the first servo piston 210a on the outer peripheral surface of the first servo piston 210a, and the engaging portion of the first crank arm 240a is engaged into in the engaging groove 211.

According to the constitution, when the first servo piston 210a is pushed toward the regular rotation direction of one side of the axis line direction, the engaging portion of the first crank arm 240a engaged into the engaging groove 211 is oscillated to one side around the corresponding control shaft 132, and thereby the control shaft 132 is rotated to the regular rotation direction around the axis line.

Similarly, when the first servo piston 210a is pushed toward the reverse rotation direction of the other side of the axis line direction, the engaging portion of the first crank arm 240a engaged into the engaging groove 211 is oscillated to the other side around the corresponding control shaft 132, and thereby the control shaft 132 is rotated to the reverse rotation direction around the axis line.

Numeral 245 in the figures designates a roller externally inserted onto the engaging portion of the first crank arm 240a.

The first servo piston 210a has a first central hole 215a formed along the axis line direction and having both ends of the axis line direction blocked in a state where the first directional switching valve 220a is reciprocatingly accommodated in the axis line direction, a first servo piston side input passage 351a having a first end opened to the outer peripheral surface to form a first input port 351a (in) and a second end opened to the first central hole 215a to form a first output port 351a (out), a first regular rotation passage 352a having a first end opened to the first central hole 215a to form a first regular rotation port 352a (F) and a second end fluidly-connected to the first regular rotation oil chamber 231a, and a first reverse rotation passage 353a having a first end opened to the first central hole 215a to form a first reverse rotation port 353a (R) and a second end fluidly-connected to the first reverse rotation oil chamber 231a (R).

The first input port 351a (in) is formed into a long groove extending in the axis line direction of the first servo piston 210a so that the first input port 351a (in) can be fluidly-connected to a first servo piston case side input passage 350a formed in the first servo piston case 230a regardless of the position of the first servo piston 210a.

The first regular rotation port 352 (F) and the first reverse rotation port 353a (R) are arranged at one side and the other side of the axis line direction so that the first output port 351a (out) is sandwiched therebetween. The first output port 351a (out) is selectively fluidly-connected to the first regular rotation port 352a (F) or the first reverse rotation port 353a (R) according to the relative position to the first servo piston 210a of the first directional switching valve 220a.

Specifically, the first directional switching valve 220a is provided with a pair of land portions for respectively blocking the first regular rotation port 352a (F) and the first reverse rotation port 353a (R) when the first switching valve 220a is positioned at an initial position (neutral position) to the first servo piston 210a, and an oil groove provided between the pair of land portions. The first output port 351a (out) is selectively fluid-connected to the first regular rotation port 352a (F) or the first reverse rotation port 353a (R) by the oil groove.

Furthermore, in the first hydraulic servomechanism 200a, there is provided a first servo drain passage 354a (see FIG. 3) for selectively fluidly-connected the first regular rotation port 352a (F) or the first reverse rotation port 353a (R) to an oil tank (the interior space of the pump case 120 in the present embodiment) according to the relative position to the first servo piston 210a of the first directional switching valve 220a.

Specifically, the first servo drain passage 354a has a first directional switching valve side drain passage 355a provided in the first directional switching valve 220a, and a first fixed servo drain passage (not shown) formed in the first servo piston 210a, the first servo piston case 230a and the pump case 120 so as to fluidly-connected the first directional switching valve side drain passage 355a to the interior space of the pump case 120.

The first directional switching valve side drain passages 355a have first ends opened to the outer peripheral surface at positions outward of the pair of land parts in the axis line direction of the first directional switching valve 220a so as to form a pair of first servo drain ports 354 a (D), and second ends fluidly-connected to the first central hole.

The first fixed servo drain passage is configured so that the first central hole is fluidly-connected to the interior space of the pump case 120 regardless of the relative position to the first servo piston case 230a of the first servo piston 210a.

According to the constitution, when the first directional switching valve 220a is moved toward the regular rotation direction of the one side of the axis line direction from the neutral position, the first output port 351a (out) is fluidly-connected to the first regular rotation port 352a (F) via the oil groove, and the first reverse rotation port 353a (R) is fluidly-connected to the first servo drain port 354a (D), thereby the first servo piston 210a is moved toward the regular rotation direction.

On the contrary, when the first directional switching valve 220a is moved toward the reverse rotation direction of the other side of the axis line direction from the neutral position, the first output port 351a (out) is fluidly-connected to the first reverse rotation port 353a (R) via the oil groove, and the first regular rotation port 352a (F) is fluidly-connected to the first servo drain port 354a (D), thereby the first servo piston 210a is moved toward the reverse rotation direction.

The first directional switching valve 220a is configured so that the relative position to the first servo piston 210a is changed based on an external operation.

In the present embodiment, the first directional switching valve 220a is operated based on a mechanical external operation.

Specifically, as shown in FIG. 6, the first hydraulic servo-mechanism 200a is provided with a first link mechanism 250a for moving the first directional switching valve along the axis line direction based on the external operation.

The first link mechanism 250a has a first engaging pin 251a having a base end engaged with the first directional switching valve 220a via an access opening provided in the first servo piston 210a, a first connecting arm 252a having a first end connected to the first engaging pin and extending outward in the radial direction on the basis of the first engaging pin 251a, a first operating shaft 253a having a base end operatively connected to the first connecting arm 252a and extending in substantially parallel to the first engaging pin 251a, and a first operating arm 254a having a base end connected to the first operating shaft 253a in a relatively non-rotatable manner.

The first link mechanism 250a oscillates the first engaging pin 251a around the first operating shaft 253a according to the rotation of the first operating shaft 253a around the axis via the first operating arm 254a, and thereby moving the first directional switching valve 220a in the axis line direction.

In the present embodiment, the first link mechanism 250a is provided with an over stroke mechanism 260 and/or a neutral returning mechanism 270.

For details, the first connecting arm 252a has a tube portion into which the first operating shaft 253a is inserted in a relatively rotatable manner around the axis.

The over stroke mechanism 260 is provided with a rotating member 261 into which the first operating shaft 253a is inserted in a relatively non-rotatable manner around the axis, and a coil spring 262 wound on both the rotating member 261 and the tube portion of the first connecting arm 252a so as to be positioned on both of them.

The rotating member 261 has a base portion into which the first operating shaft 253a is inserted in a relatively non-rotatable manner around the axis, a flange portion extending outward in the radial direction from the base portion, and an engaging piece extending along the engaging pin from the flange part.

The coil spring 262 is wound on both the tube portion of the connecting arm 252a and the base portion of the rotating member 261 in a state where both ends interpose the first engaging pin 251a and the engaging piece.

By providing the thus constructed over stroke mechanism 260, the rotating member 261 and the first connecting arm 252a are integrally rotated by the coil spring 262 within the stroke range of the first directional switching valve 220a, and only the rotating member 261 is rotated in the area exceeding the stroke range of the first directional switching valve 220a.

Therefore, even if the first operating arm 254a is excessively oscillated, shock can be prevented from applying to the first directional switching valve 220a.

As shown in FIG. 5, the neutral returning mechanism is provided with a casing 271, a pair of spring receiving members 272 arranged at both sides of the tip portion of the first engaging pin 251a so as to sandwich the tip portion, and a pair of neutral springs 273 respectively pressing the pair of spring receiving members 272 to the first engaging pin 251a.

The neutral returning mechanism 270 can be preferably provided with a neutral position adjusting rod 275.

The rod 275 is configured to be adjustable with respect to its position relative to the casing 271 in the axis line direction, and has a fixing portion 276 having the same width as that of the tip portion of the first engaging pin 251a.

The fixing portion 276 along with the tip portion of the first engaging pin 251a is interposed by the pair of spring receiving members 272

Therefore, the initial position (the position when the external control power is not applied) of the first engaging pin 251a can be easily coincided with the neutral position of the first capacity adjusting mechanism 130a by changing the position of the rod 271 in the axis line direction.

In the present embodiment, the casing 271 is connected to the first servo piston case 230a so that a space for accommodating the first connecting arm 252a and the rotating member 261 is formed between the first servo piston cases 230a and the casing 271, and the first operating shaft 253a is supported by the casing 271 in a rotatable manner around its axis.

In addition to the constitution, the hydraulic pump unit 100A may be provided with at least a charge pump unit 400 rotated and driven by the first or second pump shafts 150a, 150b.

In the present embodiment, as shown in FIGS. 4, 5, the hydraulic pump unit 100A is provided with a single charge pump body 410 rotated and driven by the first pump shaft 150a, and a charge pump case 420 connected to the port block 180 so as to surround the charge pump body 410.

Herein, a hydraulic circuit in the working vehicle 1 according to the present embodiment will be described.

As shown in FIG. 3, the working vehicle 1 is provided with the pair of first operation oil lines 300a for fluidly-connected the first hydraulic pump body 110a and the first hydraulic motor body 22a, the pair of second operation oil lines 300b for fluidly-connecting the second hydraulic pump body 110b and the second hydraulic motor body 22b, a suction line 310 having a first end fluid-connected to an oil tank 16 and a second end fluidly-connected to the suction side of the charge pump body 410, a discharge line 320 having a first end fluidly-connected to the discharge side of the charge pump body 410, a charge line 330 having a first end fluidly-connected to the discharge line 320 and second ends to the pair of first operation oil lines 300a and the pair of second operation oil lines 300b via check valves 335, respectively, a servo input line 340 having a first end fluidly-connected to the discharge line 320 and second ends fluidly-connected to the first and second hydraulic servomechanisms 200a, 200b, a first servo drain line 360a having a first end fluidly-connected to the first hydraulic servomechanism 200a and a second end fluidly-connected to an oil reservoir (in the present embodiment, the interior space of the pump case 120), and a second servo drain line 360b having a first end fluidly-connected to the second hydraulic servomechanism 200b and a second end fluidly-connected to an oil reservoir (in the present embodiment, the interior space of the pump case 120).

The pair of first operation oil lines 300a includes a pair of first operation passages 301a formed in the port block 180 so as to have first ends respectively fluidly-connected via a pair of kidney ports to the first hydraulic pump body 110a and second ends opened to the outer surface to form a pair of first operation oil ports 301a (P), and a pair of first conduits 302a extending between the pair first operation oil ports 301a (P) and the first hydraulic motor unit 20a.

The pair of first operation oil lines 300b includes a pair of second operation passages 301b formed in the port block 180 so as to have first ends respectively fluid-connected via a pair of kidney ports to the first hydraulic pump body 110b and second ends opened to the outer surface to form a pair of first operation oil ports 301b (P), and a pair of second conduits 302b extending between the pair second operation oil ports 301b (P) and the second hydraulic motor unit 20b.

The suction line 310 includes a suction conduit 311 which has a first end fluidly-connected to the oil tank 16 and in which a filter 315 is interposed, and a suction passage 312 formed in the charge pump case 420.

The suction passage 312 has a first end forming a suction port 312 (P) to which the suction conduit 311 is connected and a second end fluidly-connected to the suction side of the charge pump body 410.

The discharge line 320 has a discharge passage 321 (see FIG. 5) formed in the charge pump case 420 so as to have a first end fluidly-connected to the discharge side of the charge pump body 410.

The discharge passage 321 has a discharge port 322 (P) for charge opened to an abutting surface with the port block 180 and a discharge port 323 (P) for servo opened to the outer surface.

The charge line 330 has a charge passage 331 formed in the port block 180 so as to have a first end forming a charge port 331 (P) fluidly-connected to the discharge port 322 (P) for charge and second ends respectively fluidly-connected to the pair of first operation passages 301a and the pair of second operation passages 301b via the check valves 335.

The servo input line 340 has a first servo conduit 341a having a first end fluidly-connected to the servo discharge port 323 (P) and a second end fluidly-connected to the first servo piston case side input passage 350a, the first servo piston case side input passage 350a, the first servo piston side input passage 351a, a second servo conduit 341b having a first end fluidly-connected to the servo discharge port 323 (P) and a second end fluidly-connected to a second servo piston case side input passage 350b, the second servo piston case side input passage 350b, and a second servo piston side input passage 351b.

The first servo drain line 360a has the first servo drain passage 354a formed in the first directional switching valve 220a, the first servo piston 210a, the first servo piston case 230a and the pump case 120.

Similarly, the second servo drain line 360b has the second servo drain passage 354b formed in the second directional switching valve 220b, the second servo piston 210b, the second servo piston case 230b and the pump case 120.

As shown in FIG. 3, the working vehicle 1 according to the present embodiment further includes a first bypass line 370a which communicates between the pair of first operation oil lines 300a and in which a bypass valve 375 for communicating/blockading the first bypass line 370a is interposed, a second bypass line 370b which communicates between the pair of second operation oil lines 300b and in which a bypass valve 375 for communicating/blockading the second bypass line 370b is interposed, a self-suction line 380 for self-sucking oil from the oil reservoir (the interior space of the housing 120) to either one of the pair of first operation oil lines 300a or either one of the pair of second operation oil lines 300b having become the negative pressure at the time of stopping the charge pump body 410, and a hydraulic pressure setting line 390 for setting the hydraulic pressure of the discharge line 320.

In the self-priming line 380, a check valve 385 is interposed so as to allow the oil to flowing from the oil reservoir to the negative pressure line of the pair of first operation oil lines 300a or the negative pressure line of the pair of second operation oil lines 300b and prevent the reverse flow.

A relief valve 395 is interposed in the hydraulic pressure setting line 390.

Thus, the hydraulic pump unit 100A according to the present embodiment includes the first and second hydraulic servomechanisms 200a, 200b for respectively operating the first and second capacity adjusting mechanisms 130a and 130b by utilizing the hydraulic pressure.

Therefore, the manual operation power and the manual operation amount for operating the first and second capacity adjusting mechanisms 130a, 130b can be reduced.

In the present embodiment, as described above, both the first and second hydraulic servomechanisms 200a, 200b are operated by the operation oil from a single hydraulic pressure source (in the present embodiment, the charge pump body 410).

As described above, in the hydraulic pump unit 100A according to the present embodiment, the manual operation power and the manual operation amount for operating the first and second capacity adjusting mechanisms 130a, 130b are reduced by the first and second hydraulic servomechanisms 200a, 200b.

By utilizing this effect, the working vehicle 1 uses a single controlling member 50 (see FIGS. 1, 2) arranged on the steering post in front of the driver seat as the travel operation mechanism 10 for operating the first and second hydraulic servomechanisms 200a, 200b.

Figure 16:
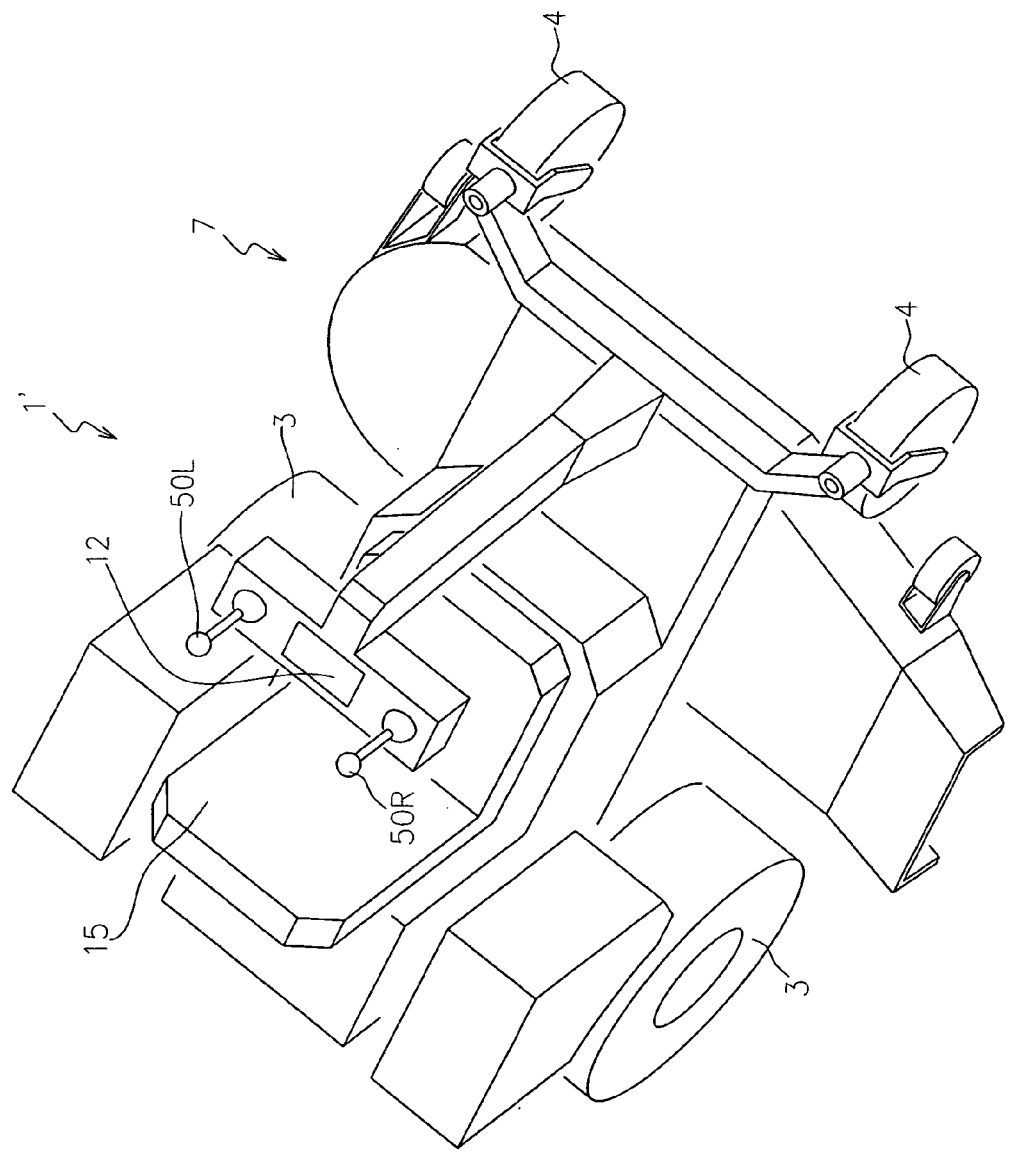
FIG. 16 is a perspective view of a working vehicle to the working vehicle shown in FIGS. 1 and 2.

Instead of the single controlling member 50, right and left controlling members 50L, 50R independently arranged on the steering post may be used as the travel operation mechanism 10 (see FIG. 16).

Figure 8:
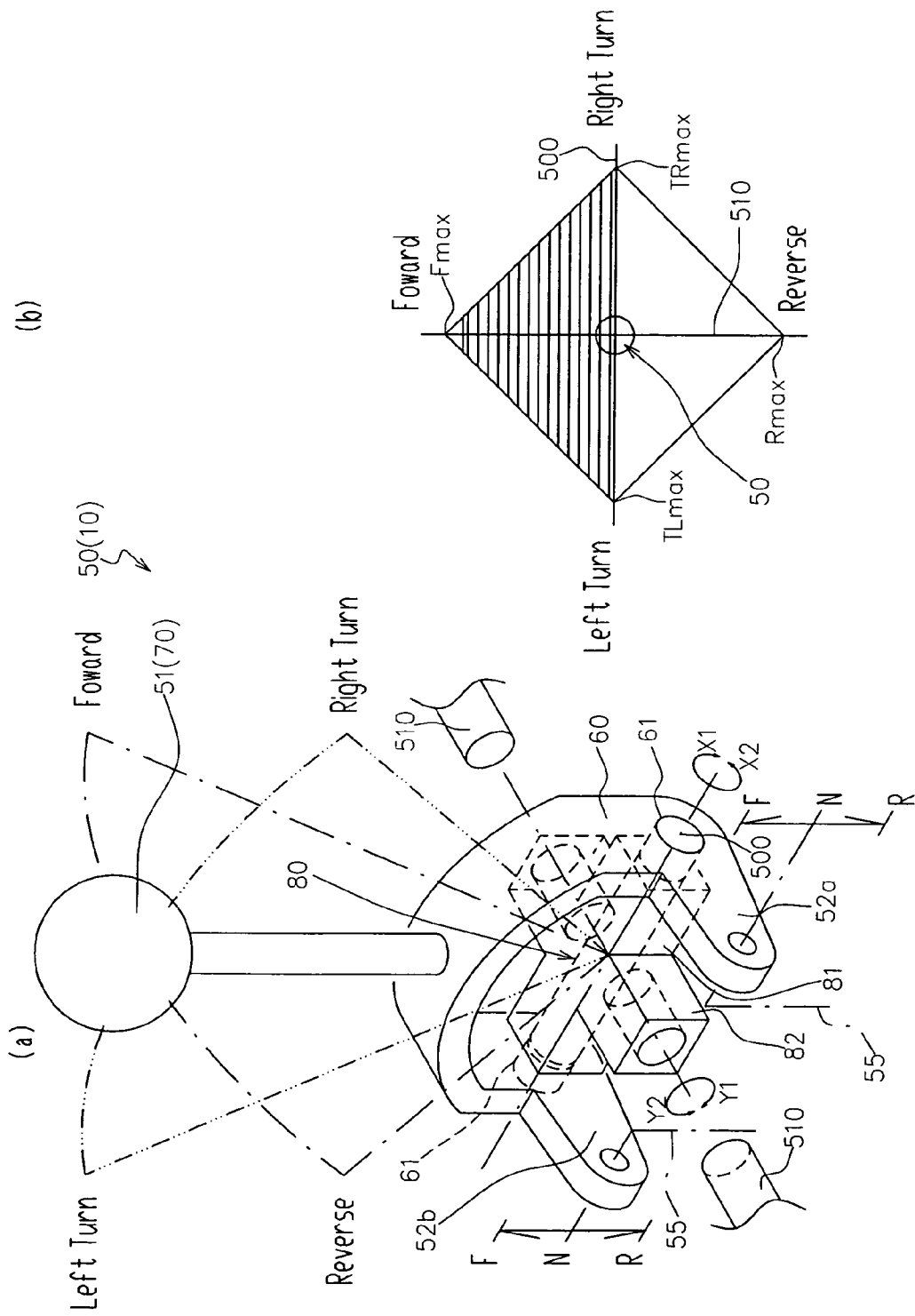
FIG. 8 (a) is a perspective view of a controlling member 50 in the working vehicle shown in FIGS. 1 and 2.

FIG. 8 (a) shows the perspective view of the controlling member 50.

As shown in FIG. 8 (a), the controlling member 50 integrally has a single controlling portion 51 capable of being manually operated, and first and second outputting portions 52a, 52b respectively operatively connected to the first and second hydraulic servomechanisms 200a, 200b. The controlling member 50 is configured so as to operate the first and second hydraulic servomechanisms 200a, 200b according to the displacement amount of the first and second outputting portions 52a, 52b.

Specifically, the controlling member 50 can be oscillated around both a traveling referential shaft 500 and a steering referential shaft 510, which are orthogonal to each other, based on the operation of the controlling portion 51. The first and second outputting portions 52a, 52b are moved in the same direction when the controlling member 50 is oscillated around the traveling referential shaft 500, and the first and second outputting portions 52a, 52b are moved in the opposite directions when the controlling member 50 is oscillated around the steering referential shaft 510.

For details, the controlling member 50 includes a body member 60 forming the first and second outputting portions 52a, 52b, a grip member 70 connected to the body member 61 and forming the controlling portion 51, and a cruciform joint member 80 connected to the body member 60 in a relatively rotatable manner via the traveling referential shaft 500.

The body member 60 has a pair of bearing portions 61 for supporting the traveling referential shaft 500, and the first and second outputting portions 52a, 52b respectively extending in the axis line direction of the steering referential shaft 510 from the pair of bearing portions 61.

The first and second outputting portions 52a, 52b are configured so as to be capable of being connected to the first and second operating arms 254a, 254b via connecting members 55 such as wire, respectively.

The cruciform joint member 80 has a forward/reverse shaft portion 81 supported in a rotatable manner around its axis by the pair of bearing portions 61 via the traveling referential shaft 500, and a steering shaft portion 82 extending in a direction orthogonal to the forward/reverse shaft portion 81.

As described above, the forward/reverse shaft portion 81 is supported in a rotatable manner around its axis by the body member 60 via the traveling referential shaft 500.

The steering shaft portion 82 has a bearing hole formed therein, and is supported in a rotatable manner around its axis by the steering referential shaft 510 provided on the vehicle frame via the bearing hole.

According to the configuration, when the controlling member 50 is oscillated around the traveling referential shaft 500, the first and second outputting portions 52a, 52b are displaced in the same direction, and when the controlling member 50 is oscillated around the steering referential shaft 510, the first and second outputting portions 52a, 52b are displaced in the different directions to each other.

That is, when the controlling member 50 is oscillated to one side (X1 direction in FIG. 8 (a)) around the traveling referential shaft 500, both the first and second outputting portions 52a, 52b are moved in the forward direction F. Therefore, the first and second hydraulic servomechanisms 200a, 200b respectively and operatively connected to the first and second outputting portions 52a, 52b tilt the first and second capacity adjusting mechanisms 130a, 130b respectively to the forward direction.

When the controlling member 50 is oscillated to the other side (X2 direction in FIG. 8 (b)) around the traveling referential shaft 500, both the first and second outputting portions 52a, 52b are moved in the reverse direction R. Therefore, the first and second hydraulic servomechanisms respectively and operatively connected to the first and second outputting portions 52a, 52b tilt the first and second capacity adjusting mechanisms 130a, 130b respectively to the reverse direction.

On the other hand, when the controlling member 50 is oscillated to one side (Y1 direction in FIG. 8 (a)) around the steering referential shaft 510, the first outputting portion 52a is moved to the reverse direction R, and the second outputting portion 52b is moved to the forward direction F. Therefore, the first hydraulic servomechanism 200a operatively connected to the first outputting portion 52a tilts the first capacity adjusting mechanism 130a to the reverse direction, and the second hydraulic servomechanism 200b operatively connected to the second outputting portion 52b tilts the second capacity adjusting mechanism 130b to the forward direction.

When the controlling member 50 is oscillated to the other side (Y2 direction in FIG. 8 (a)) around the steering referential shaft 510, the first outputting portion 52a is moved to the forward direction F and the second outputting portion 52b is moved to the reverse direction R. Therefore, the first hydraulic servomechanism 200a operatively connected to the first outputting part 52a tilts the first capacity adjusting mechanism 130a to the forward direction, and the second hydraulic servomechanism 200b operatively connected to the second outputting portion 52b tilts the second capacity adjusting mechanism 130b to the reverse direction.

More specifically, as shown in FIG. 8 (b), the controlling member 50 can be operated within an operable region defined by a first zero turn position TRmax where the controlling member 50 is maximumly oscillated to one side about the steering referential shaft 510 at the neutral position around the traveling referential shaft 500, a second zero turn position TLmax where the controlling member 50 is maximumly oscillated to the other side around the steering referential shaft 510 at the neutral position around the traveling referential shaft 500, a forward maximum output position Fmax where the controlling member 50 is maximumly oscillated to one side around the traveling referential shaft 500 at the neutral position around the steering referential shaft 510, and a reverse maximum output position Rmax where the controlling member 50 is maximumly oscillated to the other side around the traveling referential shaft 500 at the neutral position of the steering referential shaft 510.

The first and second hydraulic servomechanisms 200a, 200b are operated according to the operation position of the controlling member 50.

As shown in FIG. 2, a handrail 11 may be preferably provided on the steering post in front of the driver seat in the working vehicle 1.

That is, as described above, the working vehicle 1 is provided with the controlling member 50 having the single controlling portion 51 as the travel operation mechanism 10.

In the configuration, the driver grips the controlling member 50 only by one hand with the other hand being free. Thereby, the posture at the time of operation is hardly stabilized.

In view of this point, the handrail 11 is provided on the working vehicle 1 in the present embodiment.

Numeral 12 shown in FIG. 2 designates a meter panel for displaying the traveling speed of the vehicle and the vehicle posture relating to the pitching or rolling when traveling on a sloping ground.

Figure 9:
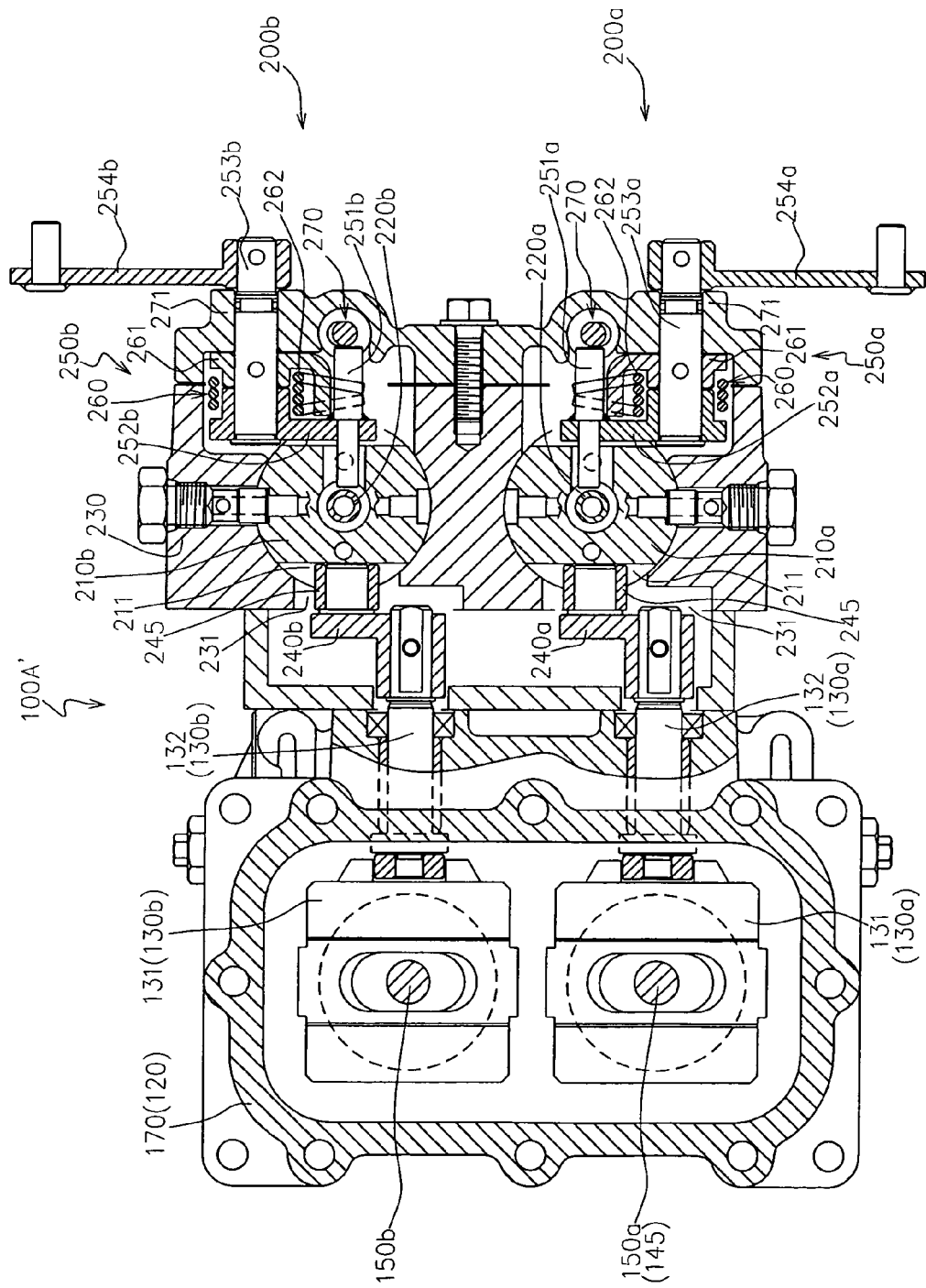
FIG. 9 is a sectional view of a hydraulic pump unit modified to the pump unit of the first embodiment.

In the present embodiment, as described above, the first and second hydraulic servomechanisms 200a, 200b have the servo piston cases (first and second servo piston cases 230a, 230b) for exclusive use, respectively. However, instead of the servo piston cases, as shown in FIG. 9, the first and second hydraulic servomechanisms 200a, 200b can be provided with a single servo piston case 230.

Embodiment 2

Hereinafter, another embodiment of the hydraulic pump unit according to the present invention will be described referring to the accompanying drawings.

Figure 10:
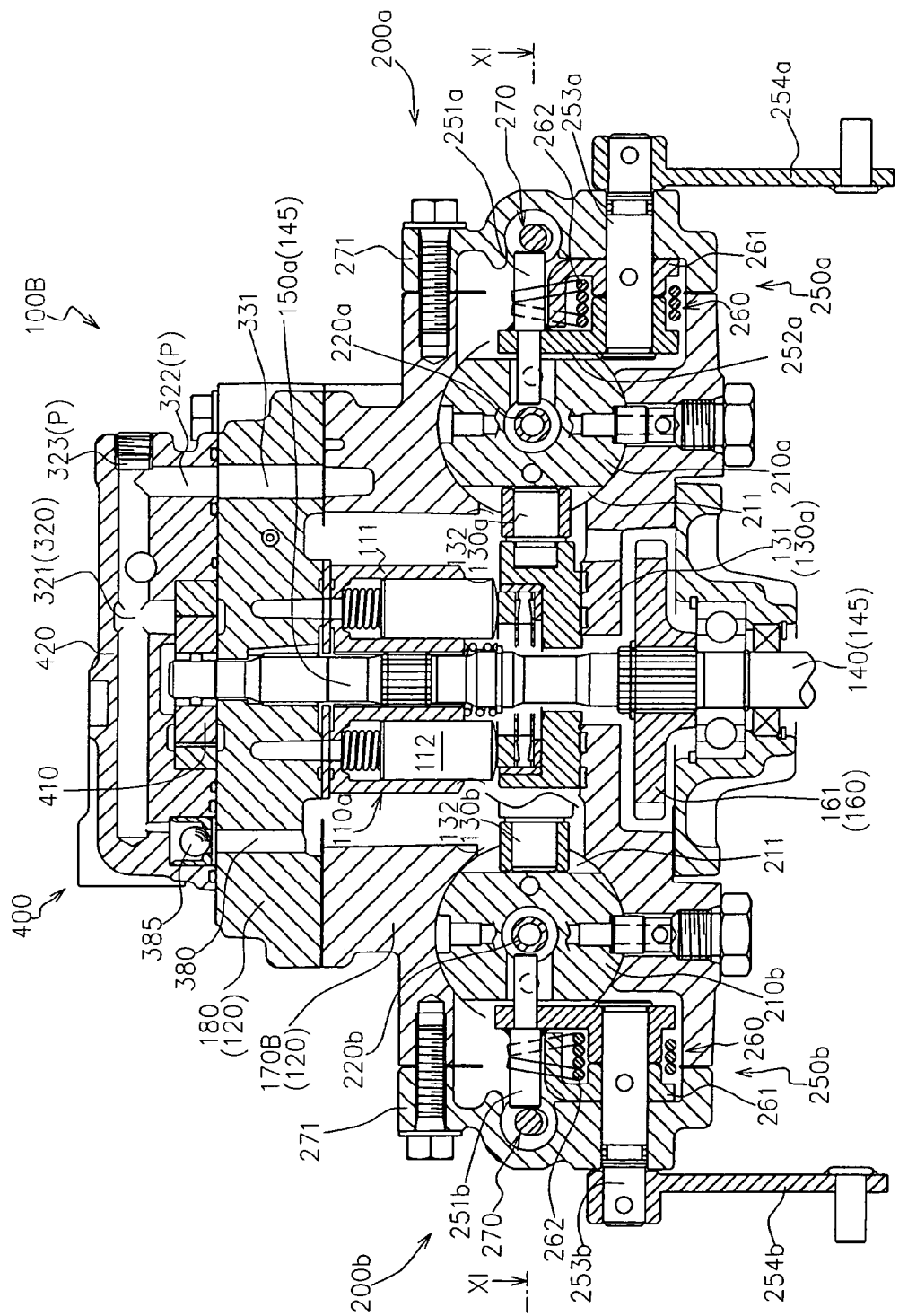
FIG. 10 is a longitudinal sectional view of a hydraulic pump unit according to a second embodiment of the present invention.

FIG. 10 shows a longitudinal sectional view of a hydraulic pump unit 100B according to the present embodiment.

Figure 11:
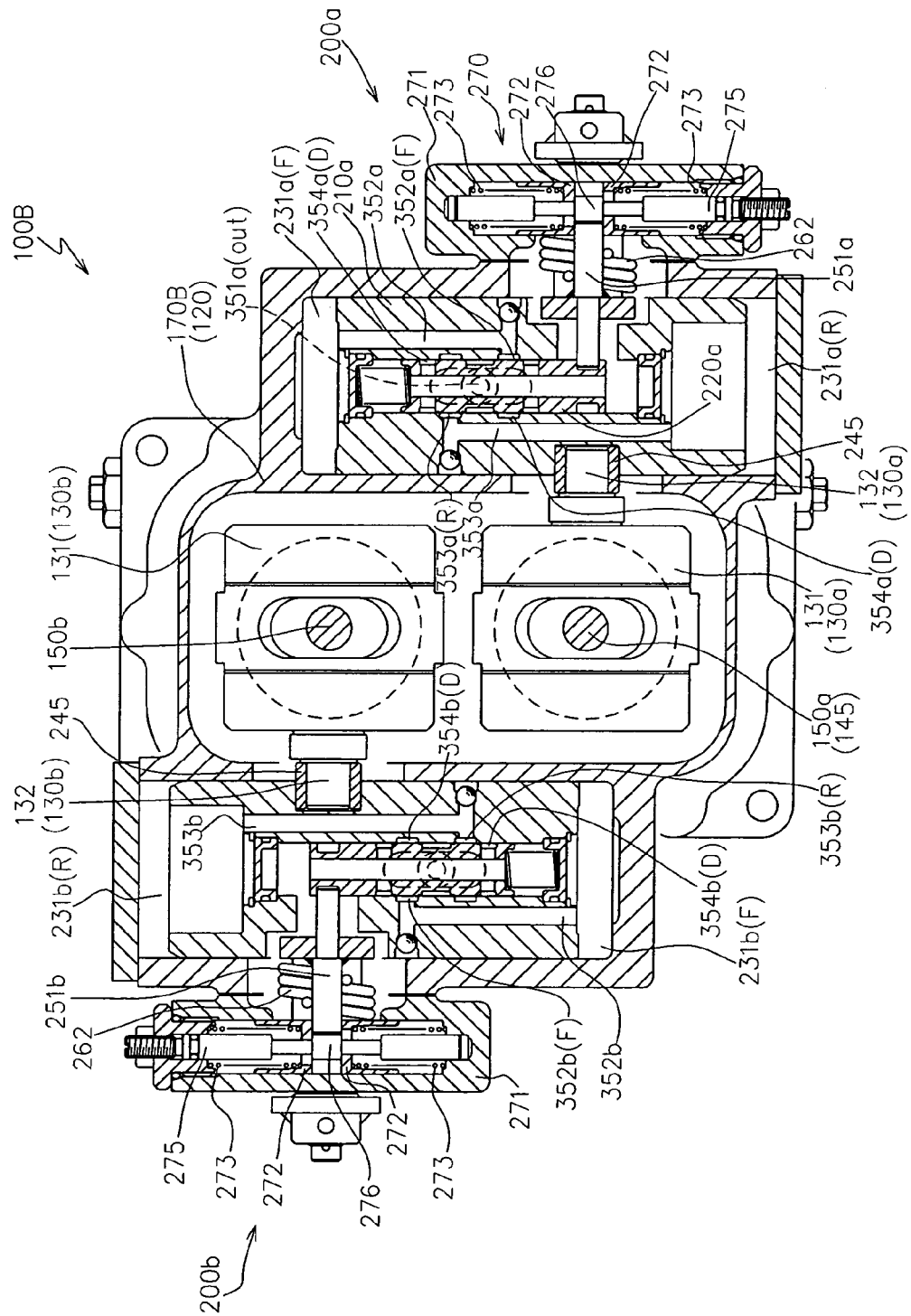
FIG. 11 is a sectional view taken in XI-XI line in FIG. 10.

FIG. 11 shows a sectional view taken in XI-XI line in FIG. 10.

As shown in FIGS. 10, 11, a hydraulic pump unit 100B according to the present embodiment is different from the hydraulic pump unit 100A mainly in that the piston accommodating chamber is provided in a wall portion of a pump case.

Therefore, the same members as the embodiment 1 in the figures are designated by the same numerals, and the detailed description thereof are omitted.

Specifically, the hydraulic pump unit 100B according to the present embodiment has a case body 170B instead of the case body 170 in the hydraulic pump unit 100A.

As shown in FIGS. 10, 11, the case body 170B is constituted so that the peripheral wall defines the first and second piston accommodating chambers.

In the present embodiment, the first and second piston accommodating chambers are defined so that the axis line directions of the first and second servo pistons 210a, 210b are orthogonal to the pump shafts 150a, 150b. Therefore, so as to prevent the interference of the first and second piston accommodating chambers, the first and second piston accommodating chambers are positioned so as to face each other across the first and second hydraulic pump bodies 110a, 110b.

In the configuration where the axis line direction of the servo piston crosses the first and second pump shafts 150a, 150b orthogonally, the first and second control shafts may be respectively and directly engaged with the first and second servo pistons.

According to the hydraulic pump unit 100B, the same effect as that of the embodiment 1 can be obtained.

Embodiment 3

Hereinafter, a further embodiment of the hydraulic pump unit according to the present invention will be described referring to the accompanying drawings.

Figure 12:
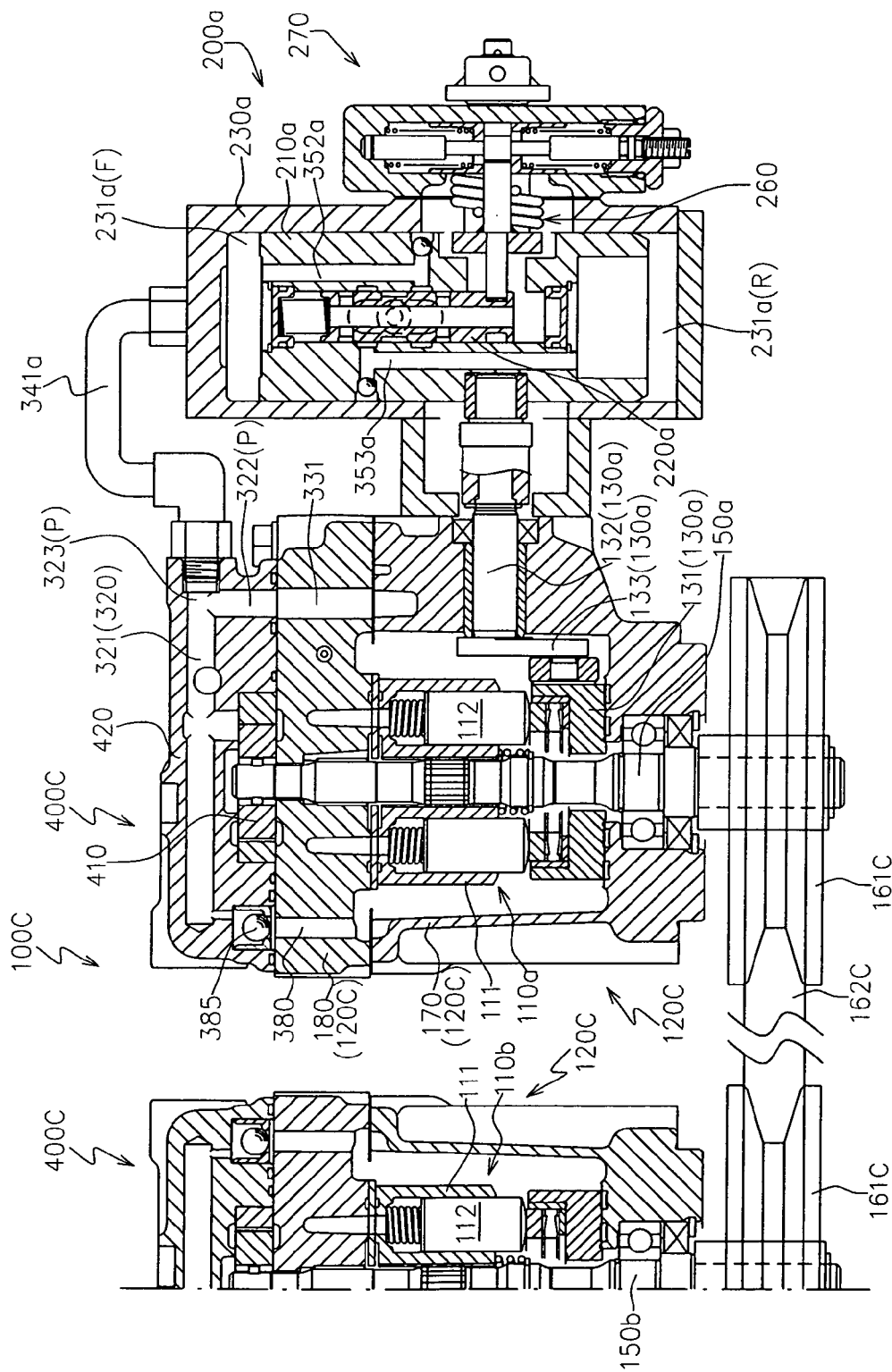
FIG. 12 is a longitudinal sectional view of a hydraulic pump unit according to a third embodiment of the present invention.

FIG. 12 shows the longitudinal sectional view of the hydraulic pump unit 100C according to the present embodiment.

The same members as those of the embodiment 1 or 2 are designated by the same numerals, and the detailed description thereof are omitted.

As shown in FIG. 12, the hydraulic pump unit 100C according to the present embodiment is provided with pump cases which respectively correspond to the first and second hydraulic pump bodies 110a, 110b.

That is, the hydraulic pump unit 100C is provided with a pair of pump cases 120C for respectively accommodating the first hydraulic pump body 110a and the second hydraulic pump body 110b. The pair of pump cases 120C are arranged in parallel.

The hydraulic pump unit 100C may be provided with a pair of pulleys 161C respectively supported by the first and second pump shafts 150a, 150b as the power transmission mechanism 160, and a belt 162C wound between the pulleys 161C to which tension is applied.

As shown in FIG. 12, the hydraulic pump unit 100C according to the present embodiment has a pair of charge pump units 400C respectively driven by the first pump shaft 150a and the second pump shaft 150b. The pair of charge pump units 400C respectively supply the operation oil to the first and second hydraulic servomechanisms 200a, 200b. Alternatively, as in the embodiments 1 and 2, only the single charge pump unit 400C may be provided in the hydraulic pump unit 100C. In the alternative configuration, the operation oil is supplied to the both the first and second hydraulic servomechanisms 200a, 200b from the single charge pump unit 400C.

Figure 17:
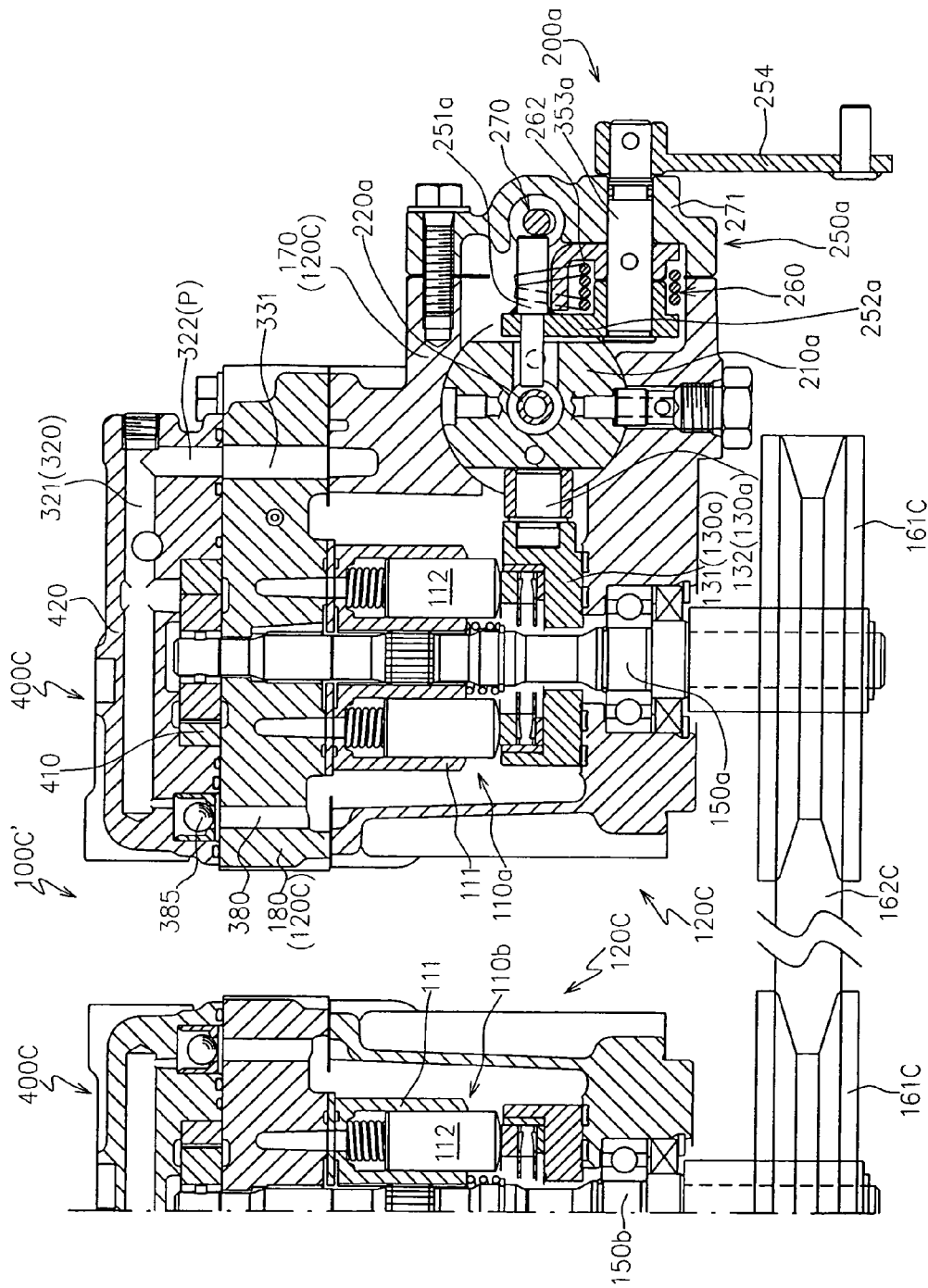
FIG. 17 is a longitudinal sectional side view of a hydraulic pump unit modified to the pump unit of the third embodiment.

Though the piston accommodating chamber is defined by the servo piston case which is a separate body from the pump case 120C as shown in FIG. 12 in the present embodiment, it is possible that the piston accommodating chamber is formed by the peripheral wall of the corresponding pump case 120C instead of the servo piston case, as shown in FIG. 17.

Embodiment 4

Hereinafter, a further embodiment of the hydraulic pump unit according to the present invention will be described referring to the accompanying drawings.

Figure 13:
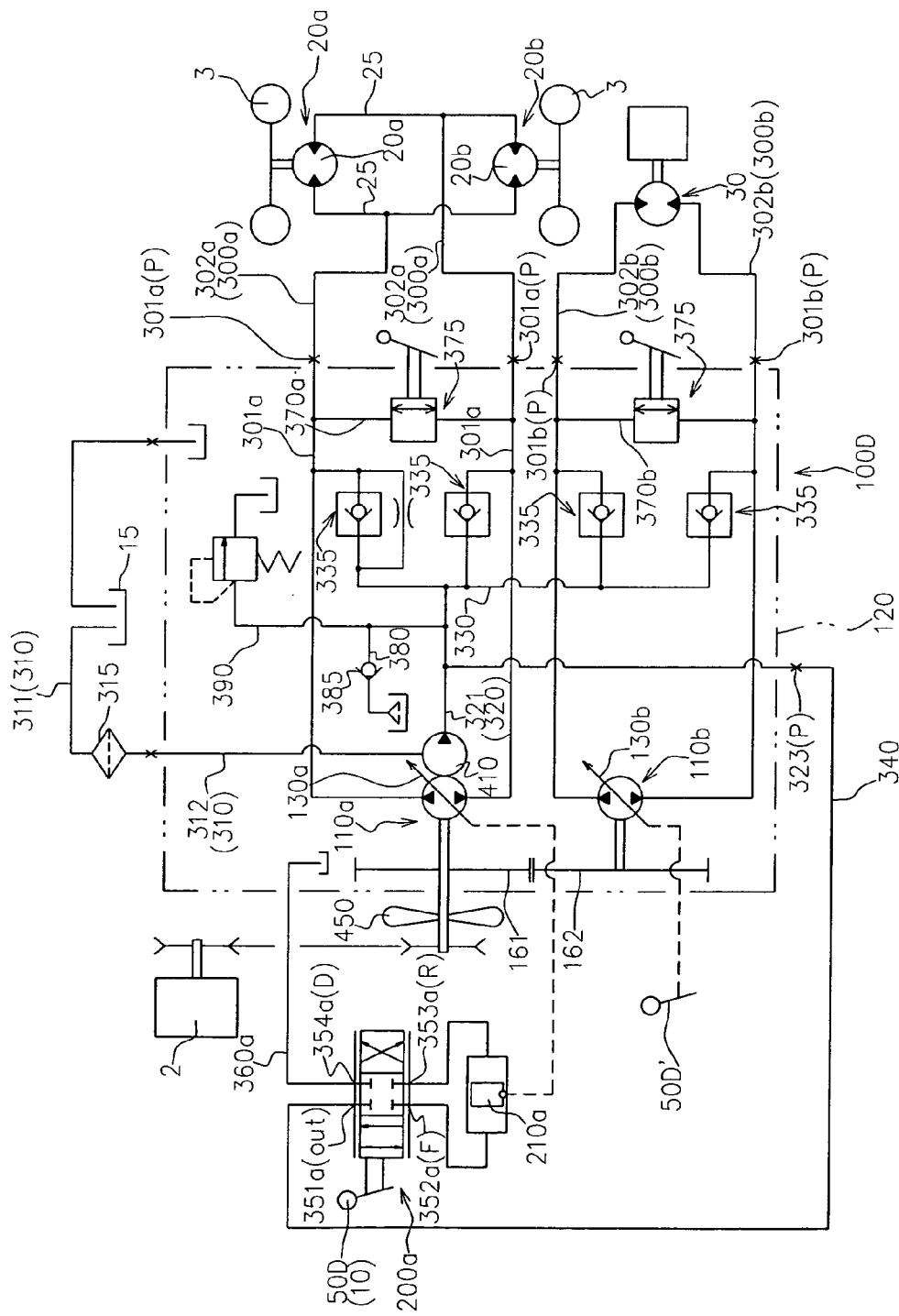
FIG. 13 is a hydraulic circuit diagram of a working vehicle to which a hydraulic pump unit according to the fourth embodiment of the present invention is applied.

FIG. 13 shows a hydraulic circuit diagram of a working vehicle to which a hydraulic pump unit 100D according to the present embodiment is applied.

Figure 14:
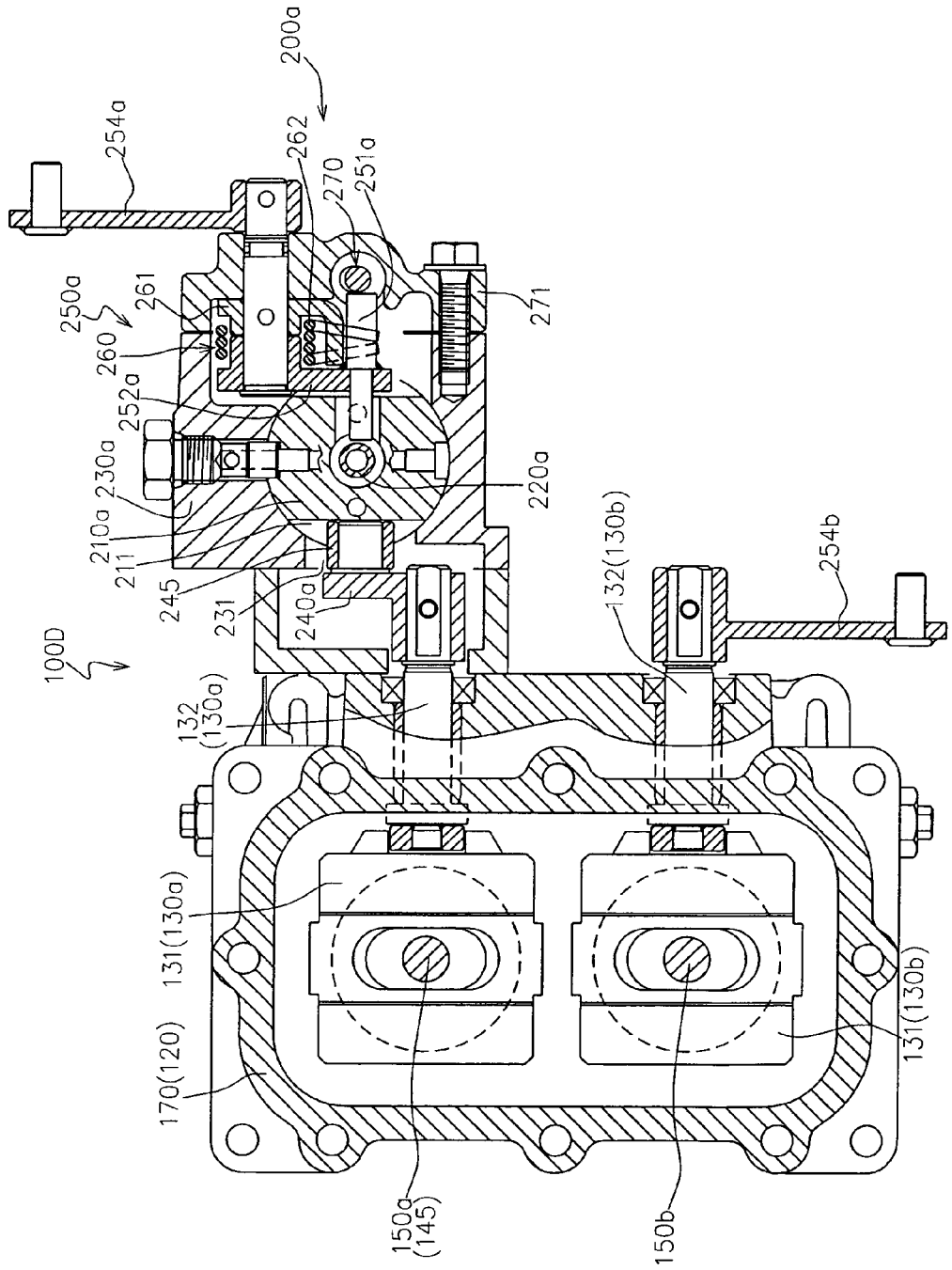
FIG. 14 is a longitudinal sectional view of the hydraulic pump unit according to the fourth embodiment.

FIG. 14 shows the longitudinal sectional view of the hydraulic pump unit 100D according to the present embodiment.

The same members as those of the embodiments 1 to 3 are designated by the same numerals, and the detailed description thereof are omitted.

As shown in FIG. 13, the hydraulic pump unit 100D according to the present embodiment is configured so as to use the first hydraulic pump body 110a as a traveling hydraulic pump body for hydraulically driving both the pair hydraulic motor bodies 22a, 22b, and use the second hydraulic pump body 110b as a hydraulic source for another hydraulic actuator 30 other than the first and second hydraulic motor units 20a, 20b.

For details, in the present embodiment, the first and second hydraulic motor units 20a, 20b are fluidly-connected with each other via a pair of hydraulic motor lines 25 so as to form a closed circuit.

The first hydraulic pump body 110a is fluidly-connected to the pair of hydraulic motor lines 25 via the pair of first operation oil lines 300a.

Specifically, the hydraulic pump unit 100D according to the present embodiment is provided with the first and second hydraulic pump bodies 110a, 110b, the pump case 120 for accommodating the first and second hydraulic pump bodies 110a, 110b, the first and second capacity adjusting mechanisms 130a, 130b for respectively changing the capacities of the first and second hydraulic pump bodies 110a, 110b, and the first hydraulic servomechanism 200a for transmitting the manual operation power via a control lever 50D to the first capacity adjusting mechanism 130a by utilizing the hydraulic force.

In the present embodiment, as shown in FIG. 14, the second capacity adjusting mechanism 130b is operated by the manual operation power via another control lever 50D' without utilizing the hydraulic force.

In the hydraulic pump unit 100D, the manual operation power and the manual operation amount for operating the travel operation mechanism 10 can be reduced.

Furthermore, as described above, in the present embodiment, the hydraulic pump unit 100D is configured so that the capacity of the first hydraulic pump body 110a acting as the hydraulic source for the pair of travel hydraulic motor units 20a, 20b is changed by the first hydraulic servomechanism 200a, and the capacity of the second hydraulic pump body 110b acting as the hydraulic source for the other hydraulic actuators 30 is changed by only the manual operation power, thereby the manual operation power for changing the capacity of the first hydraulic pump body 110a is different from the manual operation power for changing the capacity of the second hydraulic pump body 110b.

Figure 15:
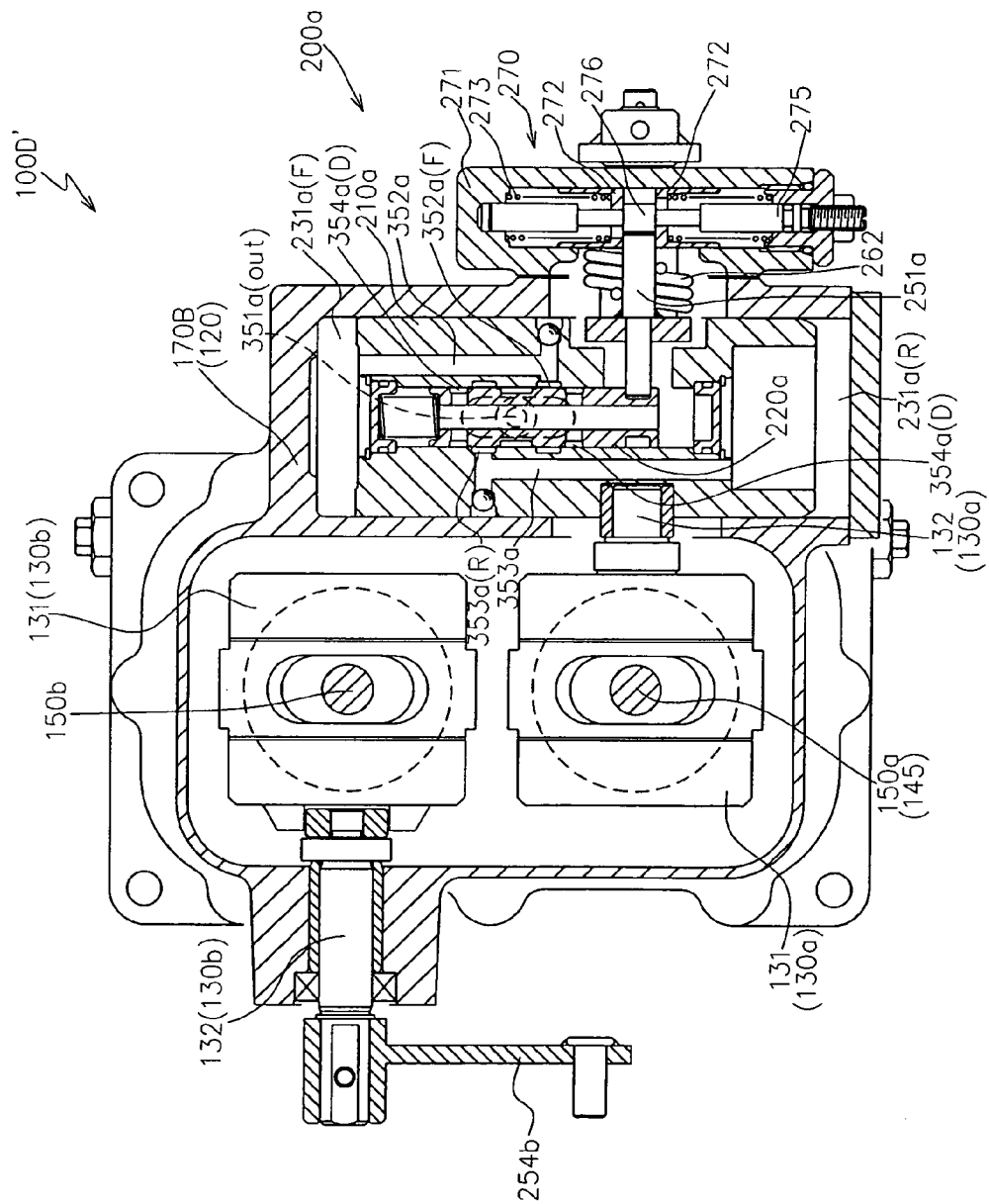
FIG. 15 is a sectional view of a hydraulic pump unit modified to the pump unit of the fourth embodiment.

Though the piston accommodating chamber in the first hydraulic servomechanism 200a is formed by the servo piston case 230a as shown in FIG. 14 in the present embodiment, of course, the piston accommodating chamber may be formed in the peripheral wall of the pump case 170B as in the embodiment 2 (see FIG. 15).

In case that the piston accommodating chamber is formed in the peripheral wall of the pump case, the control shafts 132 of the first and second capacity adjusting mechanisms 130a, 130b may be preferably projected to the opposite directions with each other.

This specification is by no means intended to restrict the present invention to the preferred embodiments set forth therein. Various modifications to the pump unit as well as the working vehicle may be made by those skilled in the art without departing from the spirit and scope of the present invention as defined in the appended claims.

What is claimed is:

1. A hydraulic pump unit of variable displacement type disposed away from a pair of hydraulic motor units which are capable of being independently arranged, the pump unit fluidly-connected to the pair of hydraulic motor units so as to change the outputs of the pair of hydraulic motor units in both forward and reverse rotation directions, comprising:

a pair of first and second hydraulic pump bodies operatively rotated and driven by a driving source, a pump case surrounding the first and second hydraulic pump bodies, a pair of first and second capacity adjusting mechanisms for respectively changing capacities of the first and second hydraulic pump bodies, and a hydraulic servomechanism for transmitting an external input based on a manual operation to the first and second capacity adjusting mechanisms by utilizing a hydraulic force, wherein each of the first and second capacity adjusting mechanisms includes an output adjusting member for changing a reciprocating range of hydraulic pistons of the corresponding hydraulic pump body according to its tilting position, and a control shaft having a base end portion operatively connected to the output adjusting member so as to tilt the output adjusting member and a tip end portion accessible from outside of the pump case, the hydraulic servomechanism includes a servo piston case defining first and second piston accommodating chambers; first and second servo pistons respectively accommodated in a reciprocating manner in the first and second piston accommodating chambers, each of the first and second servo pistons dividing the corresponding piston accommodating chamber into a regular rotation oil chamber and a reverse rotation oil chamber; and first and second directional switching valves for changing corresponding passages fluidly connected to the corresponding regular rotation oil chambers and the corresponding reverse rotation oil chambers according to the external input, each of the first and second servo pistons is formed with an engaging groove on its outer peripheral surface, the engaging groove extending in a direction orthogonal to an axis line of the servo piston, the tip ends of the control shafts of the first and second capacity adjusting mechanisms extend outward from one end surface of the pump case, and the servo piston case is detachably connected to the one end surface of the pump case so that the tip ends of the control shafts of the first and second capacity adjusting mechanisms are operatively engaged into the engaging grooves of the first and second servo pistons, respectively.

2. A hydraulic pump unit according to claim 1, wherein the pair of hydraulic motor units are fluid-connected to each other so as to form a closed circuit; and the first hydraulic pump body for traveling is fluidly-connected to the closed circuit, and the second hydraulic pump body is fluidly-connected to another hydraulic actuator other than the pair of hydraulic motor units.

3. A hydraulic pump unit according to claim 1, wherein the first and second directional switching valves are respectively incorporated in the first and second servo pistons in a movable manner relative to the corresponding servo pistons in a state of being operable by the external input, each of the first and second servo pistons is provided with flow channels including an input passage into which operation oil is inputted, and a regular rotation passage and a reverse rotation passage respectively communicated with the regular rotation oil chamber and the reverse rotation oil chamber, and the flow channels are switched according to the relative position of the first and second directional switching valves to the corresponding servo pistons.

4. A hydraulic pump unit according to claim 1, the tip end portions of the control shafts of the first and second capacity adjusting mechanisms are operatively connected to the first and second servo pistons via first and second crank arms engaged into the engaging grooves of the first and second servo pistons, respectively.

5. A hydraulic pump unit according to claim 1, wherein the tip ends portions of the control shafts of the first and second capacity adjusting mechanisms are directly engaged into the engaging grooves of the first and second servo pistons, respectively.

6. A hydraulic pump unit according to claim 1, wherein the first and second hydraulic pump bodies are accommodated in the pump case in a state that rotational axis lines of the hydraulic pump bodies are parallel to each other, the servo piston case is detachably connected to the one end surface of the pump case so that axis lines of the first and second servo pistons are parallel to the rotational axis lines of the first and second hydraulic pump bodies, and the control shafts of the first and second capacity adjusting mechanisms are operatively connected to the first and second servo pistons via first and second crank arms engaged into the engaging grooves of the first and second servo pistons, respectively.

7. A hydraulic pump unit of variable displacement type disposed away from a pair of hydraulic motor units which are capable of being independently arranged, the pump unit fluidly-connected to the pair of hydraulic motor units so as to change the outputs of the pair of hydraulic motor units in both forward and reverse rotation directions, comprising:

a pair of first and second hydraulic pump bodies operatively rotated and driven by a driving source, the first and second hydraulic pump bodies having rotational axis lines parallel to each other, a pump case surrounding the first and second hydraulic pump bodies, a pair of first and second capacity adjusting mechanisms for respectively changing capacities of the first and second hydraulic pump bodies, and a hydraulic servomechanism for transmitting an external input based on a manual operation to the first and second capacity adjusting mechanisms by utilizing a hydraulic force, wherein each of the first and second capacity adjusting mechanisms includes an output adjusting member for changing a reciprocating range of hydraulic pistons of the corresponding hydraulic pump body according to its tilting position, and a control shaft having a base end portion operatively connected to the output adjusting member so as to tilt the output adjusting member and a tip end portion accessible from outside of the pump case, the hydraulic servomechanism includes first and second servo pistons respectively accommodated in a reciprocating manner in first and second piston accommodating chambers, each of the first and second servo pistons dividing the corresponding piston accommodating chamber into a regular rotation oil chamber and a reverse rotation oil chamber; and first and second directional switching valves for changing corresponding passages fluidly connected to the corresponding regular rotation oil chambers and the corresponding reverse rotation oil chambers according to the external input, each of the first and second servo pistons is formed with an engaging groove on its outer peripheral surface, the engaging groove extending in a direction orthogonal to an axis line of the servo piston, the tip ends of the control shafts of the first and second capacity adjusting mechanisms extend outward from the pump case in an opposite direction to each other with the first and second hydraulic pump bodies sandwiched therebetween, the first and second piston accommodating chambers are positioned so as to face to each other with the first and second hydraulic pump bodies sandwiched therebetween in a state where the first and second servo pistons have axis lines orthogonal to the rotational axis lines of the first and second hydraulic pump bodies, and the tip end portions of the control shafts of the first and second capacity adjusting mechanisms are directly engaged into the engaging grooves of the first and second servo pistons, respectively.

* * * * *